United States Patent
Yasuoka

(10) Patent No.: US 9,467,920 B2
(45) Date of Patent: Oct. 11, 2016

(54) RELAY NODE, RADIO COMMUNICATION SYSTEM, AND METHOD

(71) Applicant: FUJITSU LIMITED, Kawasaki-shi, Kanagawa (JP)

(72) Inventor: Hirotomo Yasuoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/223,195

(22) Filed: Mar. 24, 2014

(65) Prior Publication Data

US 2014/0206354 A1 Jul. 24, 2014

Related U.S. Application Data

(63) Continuation of application No. PCT/JP2011/072600, filed on Sep. 30, 2011.

(51) Int. Cl.
| | |
|---|---|
| *H04W 36/30* | (2009.01) |
| *H04B 7/15* | (2006.01) |
| *H04B 7/155* | (2006.01) |
| *H04W 36/00* | (2009.01) |
| *H04W 84/04* | (2009.01) |

(52) U.S. Cl.
CPC ............. *H04W 36/30* (2013.01); *H04B 7/15* (2013.01); *H04B 7/15557* (2013.01); *H04W 36/0055* (2013.01); *H04W 84/047* (2013.01)

(58) Field of Classification Search
CPC ........... H04B 7/2606; H04B 7/15542; H04W 84/047; H04W 16/26
See application file for complete search history.

(56) References Cited

U.S. PATENT DOCUMENTS

| | | | |
|---|---|---|---|
| 2003/0235165 A1 | 12/2003 | Wang | |
| 2007/0249347 A1* | 10/2007 | Saifullah et al. | ............. 455/436 |
| 2010/0061339 A1* | 3/2010 | Kim | ................. H04W 36/0005 370/331 |
| 2010/0238854 A1* | 9/2010 | Kazmi et al. | ................. 370/315 |
| 2010/0238900 A1* | 9/2010 | Johansson et al. | ........... 370/331 |
| 2011/0038276 A1 | 2/2011 | Ninagawa | |

(Continued)

FOREIGN PATENT DOCUMENTS

| | | |
|---|---|---|
| JP | 2009-534899 | 9/2009 |
| JP | 2011-4374 | 1/2011 |

(Continued)

OTHER PUBLICATIONS

3GPP TS36.300, V10.4.0 "Evolved Universal Terrestrial Radio Access (E-UTRA) and Evolved Universal Terrestrial Radio Access Network (E-UTRAN); Overall Description; Stage 2 (Release 10)", Jun. 24, 2011.

(Continued)

*Primary Examiner* — Nathan Mitchell
*Assistant Examiner* — Ernest Tacsik
(74) *Attorney, Agent, or Firm* — Fujitsu Patent Center

(57) ABSTRACT

A relay node which is registered to a first radio base station and a first mobility management device and which relays a communication between a mobile station and the first radio base station. The relay node includes a first control unit configured to execute a handover process for the relay node and decide to hand over the mobile station from the first radio base station to a second radio base station when a degradation of radio quality between the relay node and the first radio base station is detected, and to transmit a handover control signal for the mobile station to the second radio base station or the first mobility management device.

14 Claims, 23 Drawing Sheets

(56) References Cited

U.S. PATENT DOCUMENTS

| | | | | |
|---|---|---|---|---|
| 2012/0069735 | A1* | 3/2012 | Tajima | H04B 7/155 370/225 |
| 2012/0140700 | A1* | 6/2012 | Huang | H04W 36/12 370/315 |
| 2012/0202503 | A1 | 8/2012 | Kitaji | |

FOREIGN PATENT DOCUMENTS

| | | |
|---|---|---|
| JP | 2011-61453 | 3/2011 |
| JP | 2011-097154 | 5/2011 |
| JP | 2011-135439 | 7/2011 |
| WO | 2006126261 | 11/2006 |
| WO | 2007/119168 A2 | 10/2007 |
| WO | 2010/089949 A1 | 8/2010 |
| WO | 2010089949 | 8/2010 |
| WO | 2010146661 | 12/2010 |
| WO | 2011/019973 A2 | 2/2011 |

OTHER PUBLICATIONS

3GPP TS36.423, V10.2.0 "Technical Specification Group Radio Access Network; Evolved Universal Terrestrial Radio Access Network (E-UTRAN); X2 application protocol (X2AP) (Release 10)", Jun. 24, 2011.

3GPP TS23.401, V10.4.0 "Technical Specification Group Services and System Aspects; General Packet Radio Service (GPRS) enhancements for Evolved Universal Terrestrial Radio Access Network (E-UTRAN) access; (Release 10)", Jun. 2011.

International Search Report, mailed in connection with PCT/JP2011/072600 and mailed Nov. 1, 2011.

Notification of Transmittal of Translation of the International Preliminary Report on Patentability (Form PCT/IB/338, Form PCT/IB/373 & Form PCT/ISA/237), PCT/JP2011/072600, 9 pages, dated Apr. 10, 2014.

EESR—Extended European Search Report mailed on Apr. 24, 2015 for corresponding European Application No. 11873306.2.

Huawei; "Problems of UE handover in the relaying network"; 3GPP TSG RAN WG3 #68; May 10-14, 2010; Montreal, Canada; R3-101412; Server Date May 1, 2010; Downloaded by EPO Apr. 18, 2012.

JPOA—Japanese Office Action mailed on Mar. 31, 2015 for corresponding Japanese Application No. 2013-535787 with partial English translation.

* cited by examiner

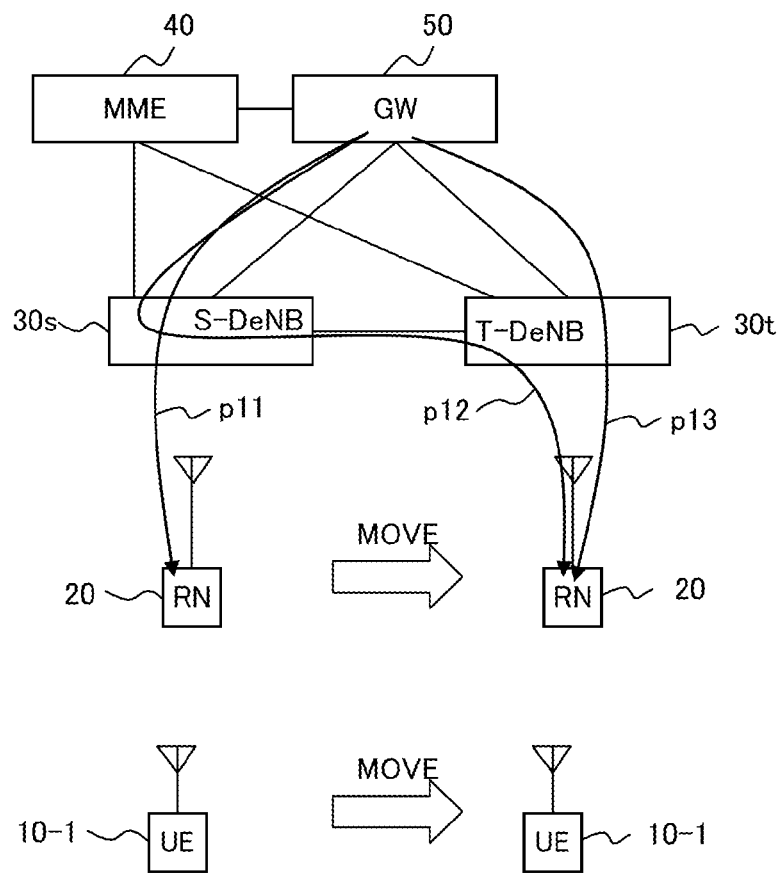
F I G. 4

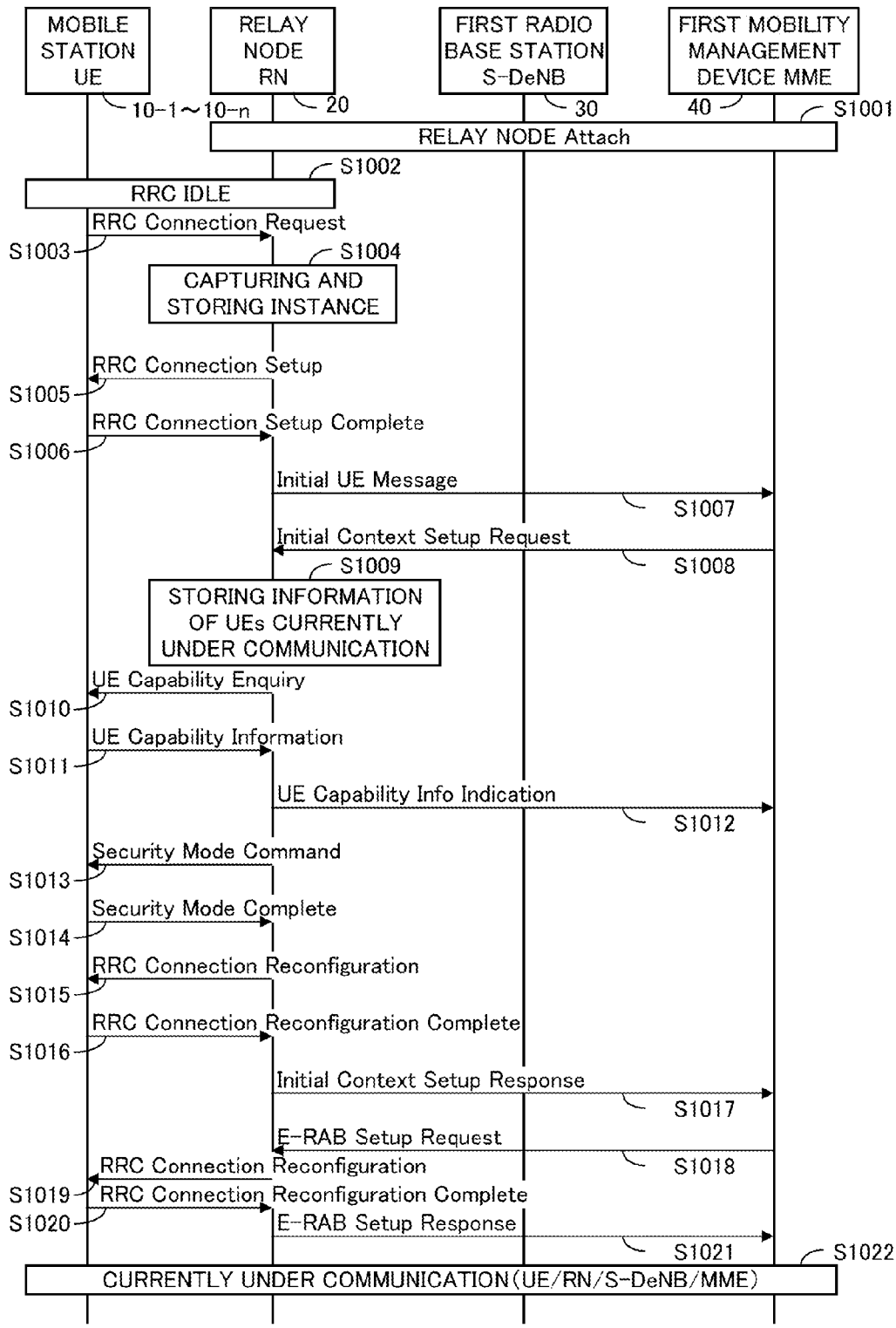
F I G. 5

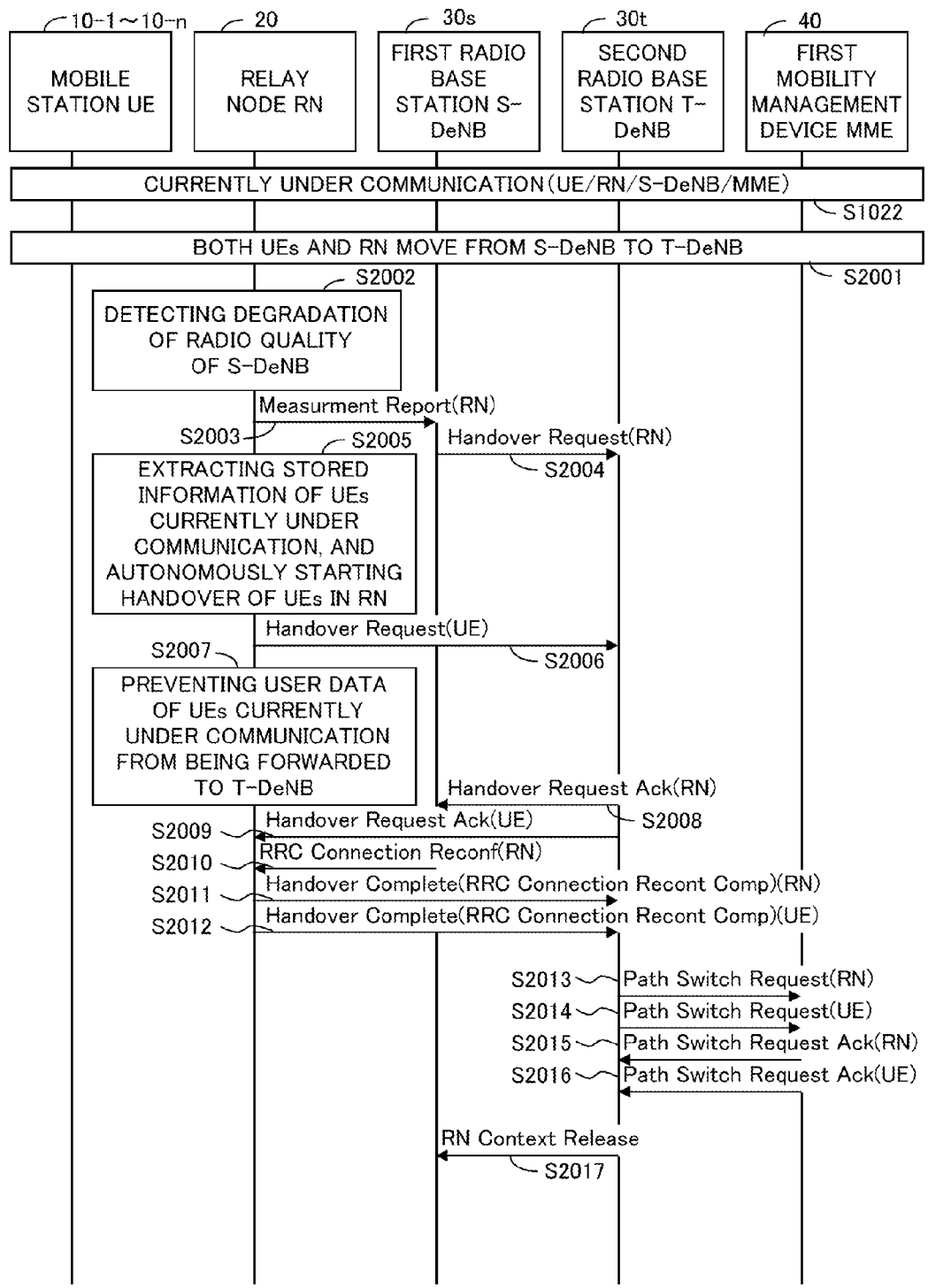
F I G. 6

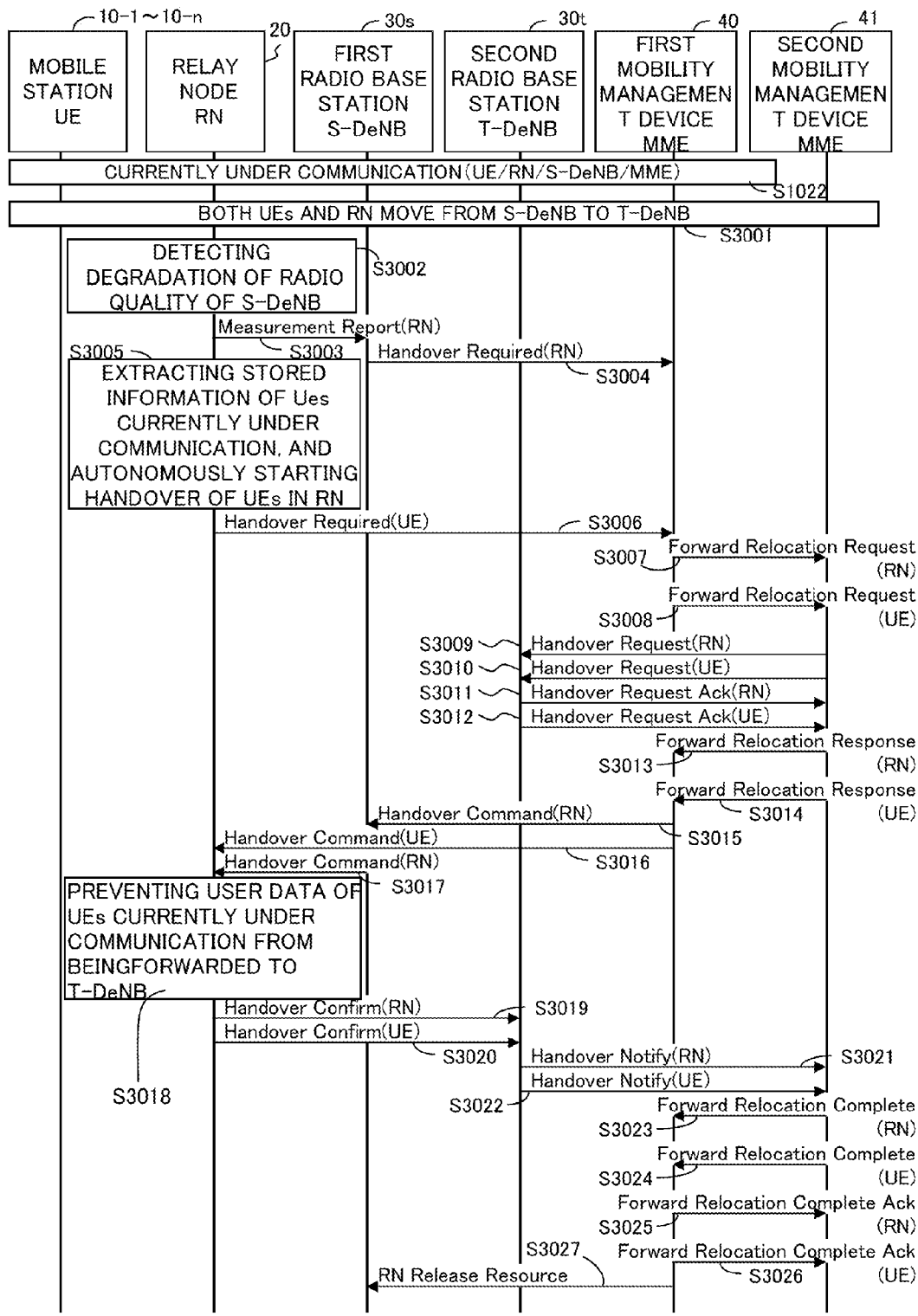
F I G. 7

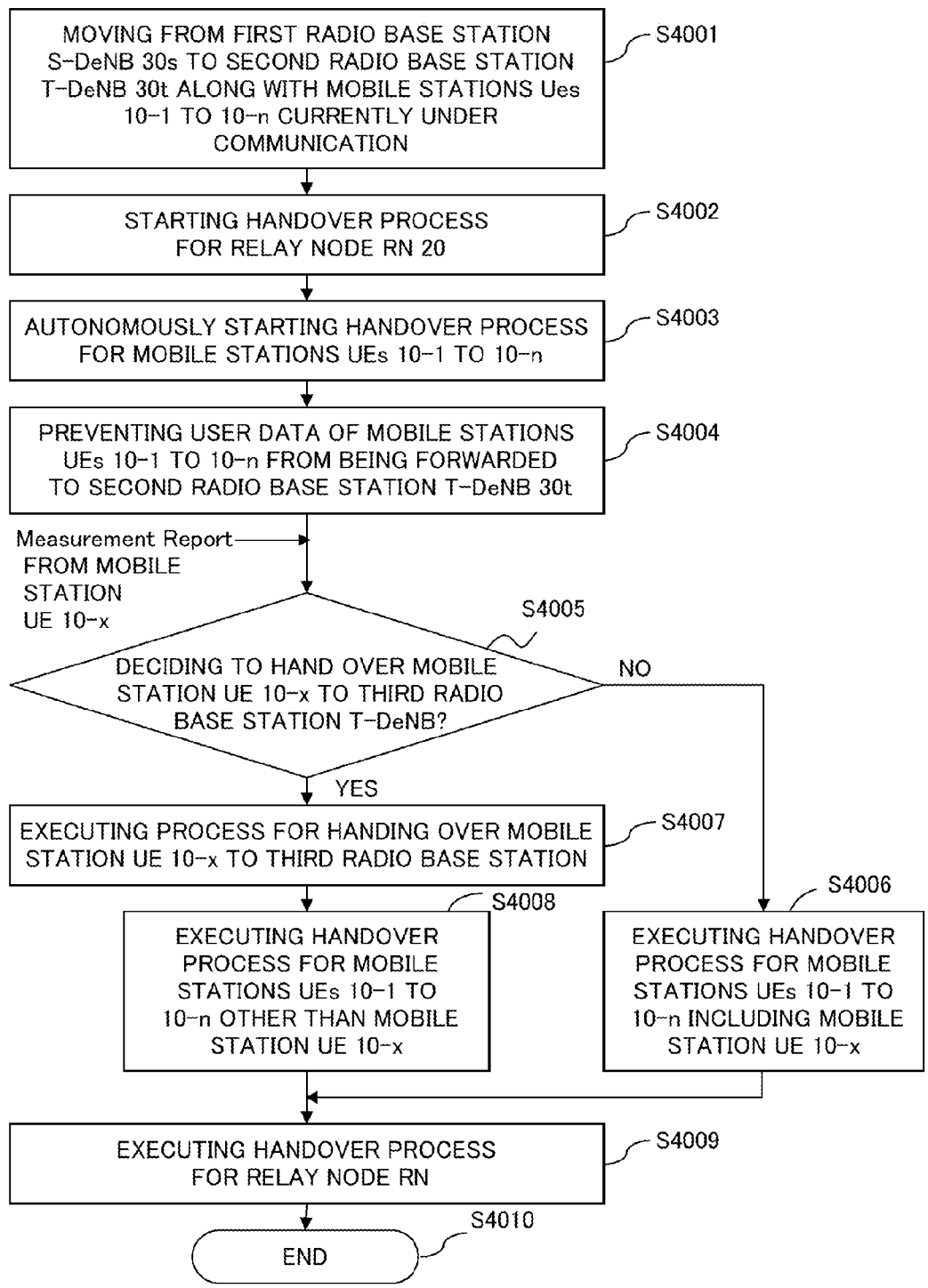
F I G. 8

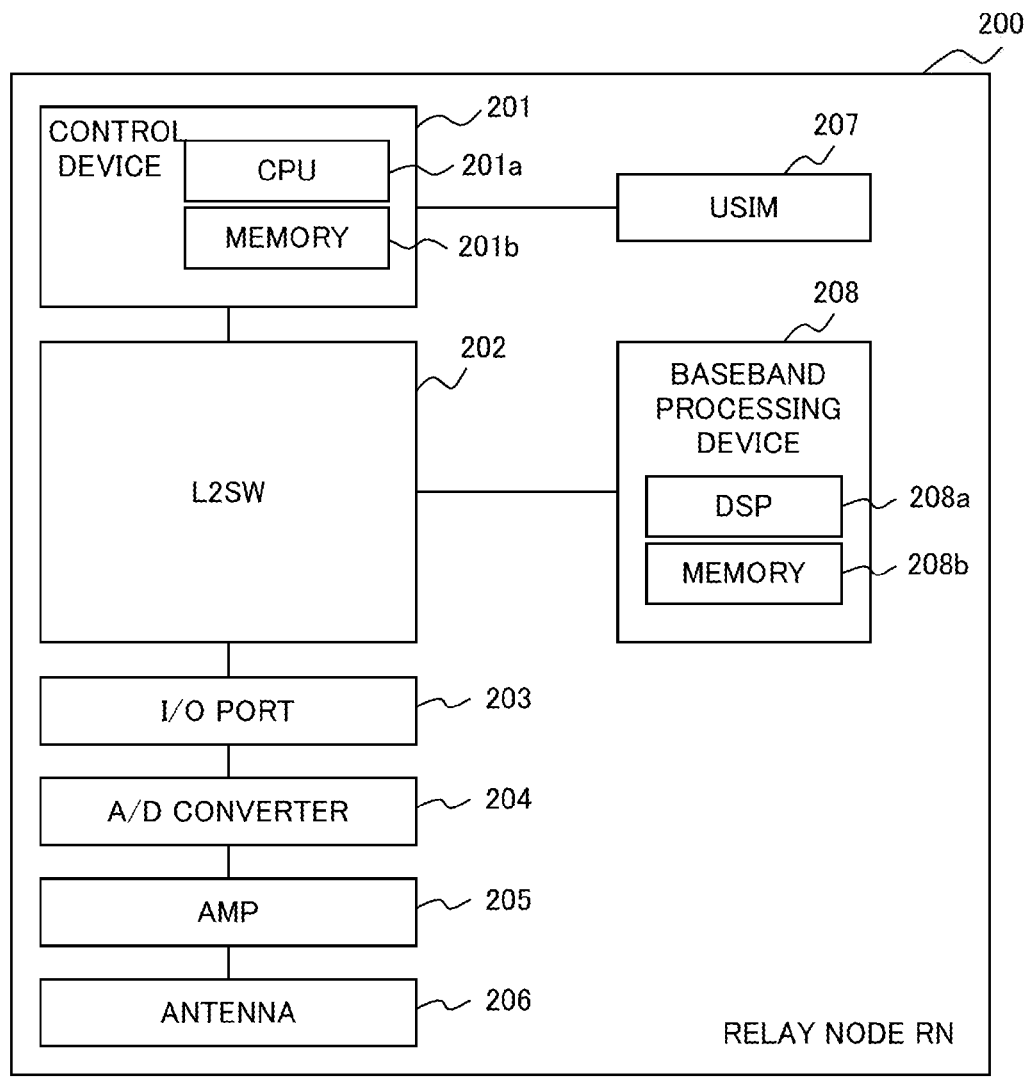
F I G. 10

| INSTANCE(C-RNTI) |
|---|
| MME UE S1AP ID |
| UE Security Capabilities |
| UE Aggregate Maximum Bit Rate |
| E-RAB ID |
| E-RAB Level QoS Parameters |
| UL GTP Tunnel Endpoint |

F I G. 1 2

| IE/Group Name | Presence |
|---|---|
| Message Type | M |
| Old eNB UE X2AP ID | M |
| Cause | M |
| Target Cell ID | M |
| GUMMEI | M |
| UE Context Information | |
| > MME UE S1AP ID | M |
| > UE Security Capabilities | M |
| > AS Security Information | M |
| > UE Aggregate Maximum Bit Rate | M |
| > Subscriber Profile ID for RAT/Frequency priority | O |
| > E-RABs To Be Setup List | |
| >>E-RABs To Be Setup Item | |
| >>>E-RAB ID | M |
| >>>E-RAB Level QoS Parameters | M |
| >>> DL Forwarding | O |
| >>> UL GTP Tunnel Endpoint | M |
| > RRC Context | M |
| >Handover Restriction List | O |
| >Location Reporting Information | O |
| >Management Based MDT Allowed | O |
| UE History Information | O |
| Trace Activation | O |
| SRVCC Operation Possible | O |
| CSG Membership Status | O |

FIG. 13

| IE/Group Name | Presence |
|---|---|
| Message Type | M |
| eNB UE X2AP ID Number | M |
| eNB UE X2AP ID Information | M |
| > Old eNB UE X2AP ID | M |
| > Cause | M |
| > Target Cell ID | M |
| > GUMMEI | M |
| UE Context Information Number | M |
| UE Context Information | |
| > MME UE S1AP ID | M |
| > UE Security Capabilities | M |
| > AS Security Information | M |
| > UE Aggregate Maximum Bit Rate | M |
| > Subscriber Profile ID for RAT/Frequency priority | O |
| > E-RABs To Be Setup List | |
| >>E-RABs To Be Setup Item | |
| >>>E-RAB ID | M |
| >>>E-RAB Level QoS Parameters | M |
| >>> DL Forwarding | O |
| >>> UL GTP Tunnel Endpoint | M |
| > RRC Context | M |
| >Handover Restriction List | O |
| >Location Reporting Information | O |
| >Management Based MDT Allowed | O |
| UE History Information | O |
| Trace Activation | O |
| SRVCC Operation Possible | O |
| CSG Membership Status | O |

F I G. 1 4

| IE/Group Name | Presence |
|---|---|
| rrcConnectionReconfigurationComplete | M |
| rrc-TransactionIdentifier | M |
| criticalExtensions | M |
| rrcConnectionReconfigurationComplete-r8 | M |
| nonCriticalExtension | O |
| criticalExtensionsFuture | M |

FIG. 15

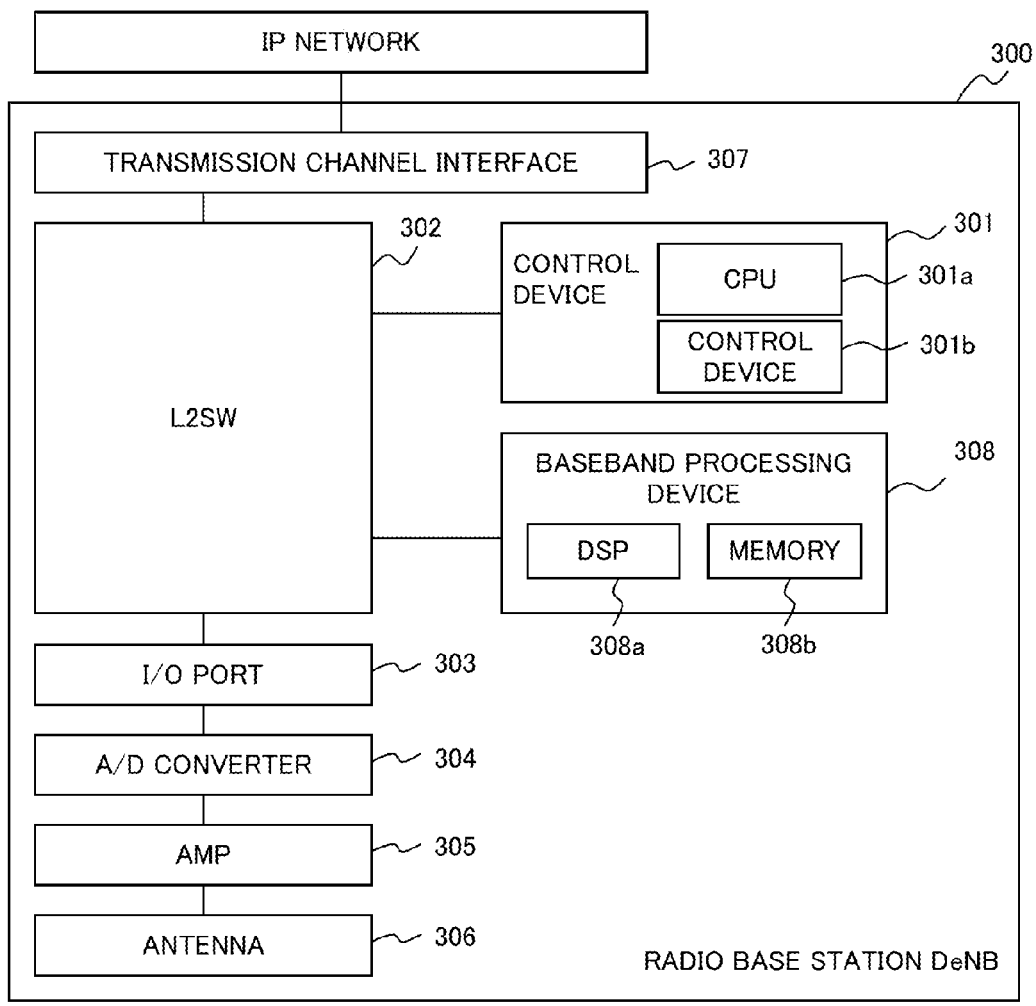
F I G. 1 6

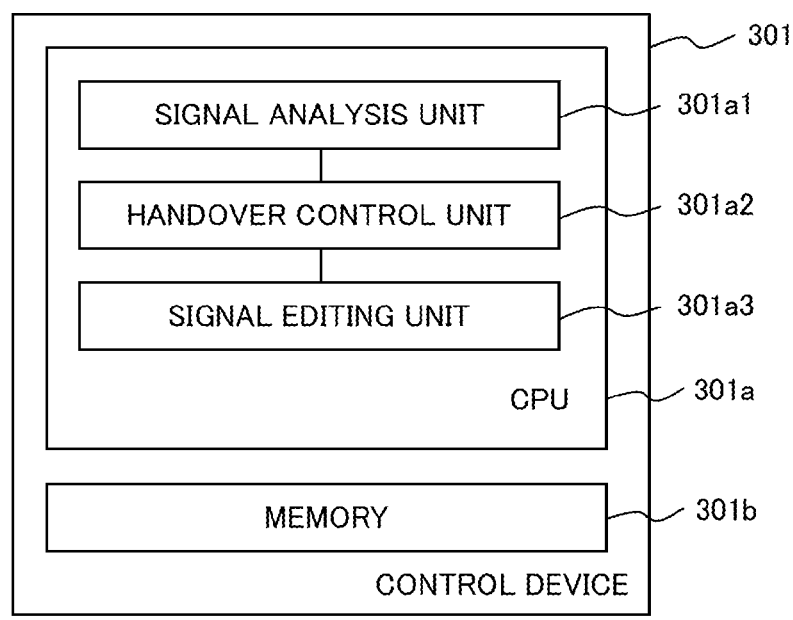
F I G. 17

| IE/Group Name | Presence |
|---|---|
| Message Type | M |
| Old eNB UE X2AP ID | M |
| New eNB UE X2AP ID | M |
| E-RABs Admitted List | |
| > E-RABs Admitted Item | |
| >> E-RAB ID | M |
| >> UL GTP Tunnel Endpoint | O |
| >> DL GTP Tunnel Endpoint | O |
| E-RABs Not Admitted List | O |
| Target eNB To Source eNB Transparent Container | M |
| Criticality Diagnostics | O |

F I G. 1 8

| IE/Group Name | Presence |
|---|---|
| Message Type | M |
| eNB UE X2AP ID Number | M |
| eNB UE X2AP ID Information | M |
| > Old eNB UE X2AP ID | M |
| > New eNB UE X2AP ID | M |
| > E-RABs Admitted List | |
| >> E-RABs Admitted Item | |
| >>> E-RAB ID | M |
| >>> UL GTP Tunnel Endpoint | O |
| >>> DL GTP Tunnel Endpoint | O |
| > E-RABs Not Admitted List | O |
| > Target eNB To Source eNB Transparent Container | M |
| > Criticality Diagnostics | O |

FIG. 19

RELAY NODE, RADIO COMMUNICATION SYSTEM, AND METHOD

CROSS-REFERENCE TO RELATED APPLICATIONS

This application is a continuation application of International Application PCT/JP2011/072600 filed on Sep. 30, 2011 and designated the U.S., the entire contents of which are incorporated herein by reference.

FIELD

The present invention relates to a relay node, a radio communication system, and a radio communication method, which relay a communication between a mobile station and a first radio base station and hand over a mobile station currently under communication from the first radio base station to a second radio base station along with the relay node.

BACKGROUND

In recent years, a high-speed communication service in conformity with a radio communication system standard called Long Term Evolution (LTE) has been started. Moreover, LTE-Advanced system, which is a developed form of LTE, is currently being discussed in 3rd Generation Partnership Project (3GPP).

For the LTE-Advanced system, a relay technique using a relay node (RN) that relays a communication between a mobile station (User Equipment, UE) and a radio base station (evolved Node B (eNodeB)) is currently under study. The radio base station eNodeB, connected to the relay node RN, is referred to as Donor eNodeB (DeNB).

With the above described relay technique currently under study for the LTE-Advanced system, the relay node RN possesses functions similar to those of the radio base station eNodeB. The functions of the radio base station eNodeB, which are possessed by the relay node RN, include a termination of wireless protocols of an Evolved Universal Terrestrial Radio Access (E-UTRA) radio interface, an S1 interface, and an X2 interface. The relay node RN can possess, for example, functions defined by the radio base station eNodeB, such as Radio Network layer (RNL), a Transport Network Layer (TNL), and the like.

Additionally, the relay node RN includes some of the functions of the mobile station UE in addition to the functions of the radio base station eNodeB. For example, as illustrated in FIG. 1, the relay node RN s1 includes functions illustrated in FIG. 1 in order to make a radio connection to a radio base station DeNB s2 and a mobility management device MME s3. Namely, the relay node RN s1 includes a physical layer (PYS) f1, a Media Access Control (MAC) f2, a Radio Link Control (RLC) f4, a Packet Data Convergence Protocol (PDCP) f3, a Radio Resource Control (RRC) f5, and a Non-Access Stratum (NAS) f6.

With the above described relay technique, E-UTRAN Radio Access Bearer (E-RAB) is set between the mobile station UE and a node (Core Node, CN) of a core network called Evolved Packet Core (EPC). Moreover, a Uu bearer is set between the mobile station UE and the relay node RN, a Un bearer is set between the relay node RN and the radio base station DeNB, and an S1 bearer is set between the radio base station DeNB and the core node CN.

In 3GPP, a consensus is reached to lay down specifications for implementing a layer 3 relay node that includes the same functions as those of a base station, such as mobility management, session setup, a handover, and the like, in LTE Release 10, which is currently being standardized.

The relay node RN can be used to expand a communication area (coverage) or increase a traffic volume. A variety of scenarios where such a relay node is installed are assumed.

As one of the assumed scenarios, a scenario where a relay node RN is mounted in a moving vehicle and connected to an optimum radio base station DeNB with a move of the moving vehicle in order to provide a communication area to a mobile station UE possessed by a passenger within the moving vehicle such as a bus, a train, or the like can be cited.

In the above described scenario where the relay node RN is mounted in the moving vehicle, the relay node RN is demanded to have a handover control procedure in order to connect to the optimum radio base station DeNB as with the move of the moving vehicle.

Conventional techniques include a technique with which a radio relay station connected to a radio base station switches a connection destination to another radio base station or a terminal connected to the radio relay station is handed over to another radio base station when a load of the radio base station exceeds a threshold value.

In addition, the conventional techniques include a technique with which a mobile base station is mounted in a vehicle set so as to interrupt a radio communication between an inside and an outside of the vehicle, and a cellular phone within the vehicle is set to communicate with a stationary base station outside the vehicle only via the mobile base station.

Furthermore, the conventional techniques include the following technique. Namely, a first radio base station notifies a relay node of specified timing when the relay node performs a handover from the first radio base station to a second radio base station. The second radio base station performs scheduling so that a downstream signal is transmitted to the relay node at the specified timing. The relay node performs scheduling so that the downstream signal is transmitted at timing other than the specified timing.

In the scenario where the relay node RN is mounted in the moving vehicle, the relay node RN is demanded to have a handover control procedure in order to connect to an optimum radio base station DeNB with the move of the moving vehicle as described above.

Namely, the relay node RN mounted in the moving vehicle and the mobile station UE within the moving vehicle travels with the move of the moving vehicle. Accordingly, the relay node RN needs to be handed over from a currently connected first radio base station Source-DeNB (S-DeNB) to a target second radio base station Target-DeNB (T-DeNB) which is newly determined to be optimum, along with the mobile station UE currently under communication.

A specific handover control procedure in the above described scenario is not standardized in 3GPP. Accordingly, the handover control procedure standardized in 3GPP, which is used in the case where the mobile station UE is handed over from the first radio base station S-DeNB to the second radio base station T-DeNB, is considered to be applied to the handover control procedure in the above described scenario.

However, if the handover control procedure standardized in 3GPP in the case where the mobile station UE is handed over between radio base stations is applied in the above described scenario, this poses the following problem associated with forwarding of user data at the time of the handover.

With the handover control procedure standardized for LTE, user data is forwarded from a first radio base station S-DeNB to a second radio base station T-DeNB when the mobile station UE is handed over from the first radio base station S-DeNB to the second radio base station T-DeNB. Namely, forwarding of the user data is performed from the first radio base station S-DeNB to the second radio base station T-DeNB so that a packet yet to be transmitted from the first radio base station S-DeNB to the mobile station UE is forwarded. With the forwarding of the user data in this way, the second radio base station T-DeNB can transmit the packet forwarded from the first radio base station S-DeNB to the mobile station UE upon completion of the handover. This can prevent the packet from being lost by the handover.

FIG. 2 is an explanatory diagram of a first case where the handover control procedure standardized in 3GPP is applied.

In a radio communication system illustrated in FIG. 2, a mobile station UE 1 is present within a communication area of a relay node RN 2, and connected to the relay node RN 2. The relay node RN 2 is present within a communication area of a first radio base station S-DeNB 3s, and connected to the first radio base station S-DeNB 3s. The first radio base station S-DeNB 3s is connected to each of a Mobility Management Entity (MME) 4 and a gateway (GW) 5. A second radio base station T-DeNB 3t is connected to each of the mobility management device MME 4 and the gateway GW 5.

In the radio communication system illustrated in FIG. 2, user data of the mobile station UE 1 under the control of the relay node RN 2 is forwarded to the relay node RN 2 via the gateway GW 5 and the first radio base station S-DeNB 3s.

Assume that the mobile station UE 1 moves from the communication area of the relay node RN 2 under the control of the first radio base station S-DeNB 3s to the communication area of the second radio base station T-DeNB 3t in the radio communication system of FIG. 2. Also assume that a handover of the mobile station UE 1 from the first radio base station S-DeNB 3s via the relay node RN 2 to the second radio base station T-DeNB 3t is caused by the move of the mobile station UE 1.

When the above assumed handover is caused, forwarding of user data, which accompanies the handover, is performed on a path p1 indicated by an arrow line of FIG. 2.

Namely, the user data forwarded from the gateway GW 5 to the relay node RN 2 via the first radio base station S-DeNB is returned from the relay node RN 2 to the first radio base station S-DeNB 3s. Then, the first radio base station S-DeNB 3s forwards the user data returned from the relay node RN 2 to the second radio base station T-DeNB 3t.

Upon completion of the handover, the second radio base station T-DeNB 3t transmits the user data forwarded from the first radio base station S-DeNB 3s to the mobile station UE 1 that has moved to the communication area of the second radio base station T-DeNB 3t.

FIG. 3 is an explanatory diagram of a second case where the handover control procedure standardized in 3GPP is applied.

The case illustrated in FIG. 2 is the case where the relay node RN 2 stays within the communication area of the first radio base station S-DeNB 3s and the mobile station UE 1 moves from the communication area of the relay node RN 2 to the communication area of the second radio base station 3t, causing an occurrence of a handover of the mobile station UE 1.

In the meantime, the case illustrated in FIG. 3 is the case where a handover occurs in the mobile station UE 1 due to a move of the mobile station UE 1 from the communication area of the first radio base station S-DeNB 3s to the communication area of the second radio base station T-DeNB 3t along with the relay node RN 2.

Assume that the handover control procedure, standardized in 3GPP, for the mobile station UE between the radio base stations, is applied in the case illustrated in FIG. 3 similarly to the case illustrated in FIG. 2. In this case, data forwarding that accompanies the handover is performed on a path p2 indicated by an arrow line of FIG. 3 in the handover case illustrated in FIG. 3.

Namely, the user data forwarded from the gateway GW 5 to the relay node RN 2 via the first radio base station S-DeNB is returned from the relay node RN 2 to the first radio base station S-DeNB 3s. Then, the first radio base station S-DeNB 3s forwards the user data returned from the relay node RN 2 to the second radio base station T-DeNB 3t. Moreover, the second radio base station T-DeNB 3t again forwards the user data forwarded from the first radio base station S-DeNB to the relay node RN 2 that has moved to the communication area of the second radio base station T-DeNB 3t.

As described above, forwarding of user data is performed to prevent a packet from being lost by a handover. Accordingly, forwarding of user data from and to the same relay node RN 2 as indicated by the path p2 of FIG. 3 is an unneeded process. Moreover, it cannot be said that forwarding of user data from and to the same relay node is an efficient use of a radio channel.

PRIOR ART DOCUMENTS

Patent Documents

Patent Document 1: Japanese Laid-open Patent Publication No. 2011-61453
Patent Document 2: WO 2006/126261
Patent Document 3: Japanese Laid-open Patent Publication No. 2011-4374

Non-Patent Documents

Non-Patent Document 1: 3GPP TS36.300, "Evolved Universal Terrestrial Radio Access (E-UTRA) and Evolved Universal Terrestrial Radio Access Network (E-UTRAN); Overall Description; Stage 2 (Release 10)", Jun. 24, 2011
Non-Patent Document 2: 3GPP TS36.423, Technical Specification Group Radio Access Network; Evolved Universal Terrestrial Radio Access Network (E-UTRAN); X2 application protocol (X2AP) (Release 10), Jun. 24, 2011
Non-Patent Document 3: 3GPP TS23.401, "Technical Specification Group Services and System Aspects; General Packet Radio Service (GPRS) enhancements for Evolved Universal Terrestrial Radio Access Network (E-UTRAN) access (Release 10), Jun. 10, 2011

SUMMARY

According to an aspect of the embodiments, a relay node which is registered to a first radio base station and a first mobility management device and which relays a communication between a mobile station and the first radio base station, the relay node includes a first control unit configured to execute a handover process for the relay node and decide to hand over the mobile station from the first radio base station to a second radio base station when a degradation of radio quality between the relay node and the first radio base station is detected, and to transmit a handover control signal for the mobile station to the second radio base station or the first mobility management device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates a configuration example of a radio communication system according to an embodiment;

FIG. 5 is a sequence diagram of a handover control procedure according to the embodiment until a mobile station UE starts a communication;

FIG. 6 is a sequence diagram of the handover control procedure according to the embodiment in an X2 handover case;

FIG. 7 is a sequence diagram of a handover control according to the embodiment in an S1 handover case;

FIG. 8 is a flowchart illustrating a handover process of a relay node RN when the relay node receives a "radio environment measurement report" message from the mobile station UE;

FIG. 10 illustrates a hardware configuration of the relay node RN according to the embodiment;

FIG. 12 illustrates an example of an information table stored in an under-communication mobile station information storage unit for each mobile station UE;

FIG. 13 illustrates a configuration example of a "handover request" message according to the embodiment;

FIG. 14 illustrates another configuration example of the "handover request" message according to the embodiment;

FIG. 15 illustrates a configuration example of a "handover complete (radio resource control connection reconfiguration complete)" message according to the embodiment;

FIG. 16 illustrates a hardware configuration of a radio base station DeNB according to the embodiment;

FIG. 17 illustrates a functional configuration of a control device of the radio base station DeNB according to the embodiment;

FIG. 18 illustrates a configuration example of a "handover request acknowledgment" message according to the embodiment;

FIG. 19 illustrates another configuration example of a "handover request acknowledgment" message according to the embodiment;

Figure 22:
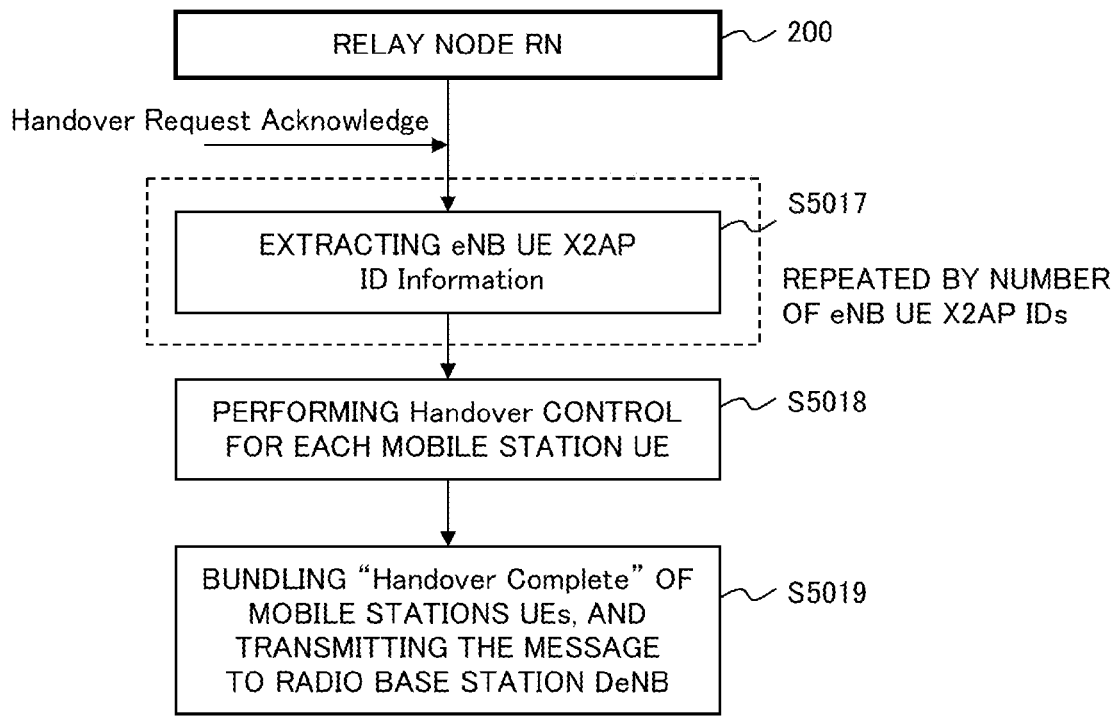
Figure 23:
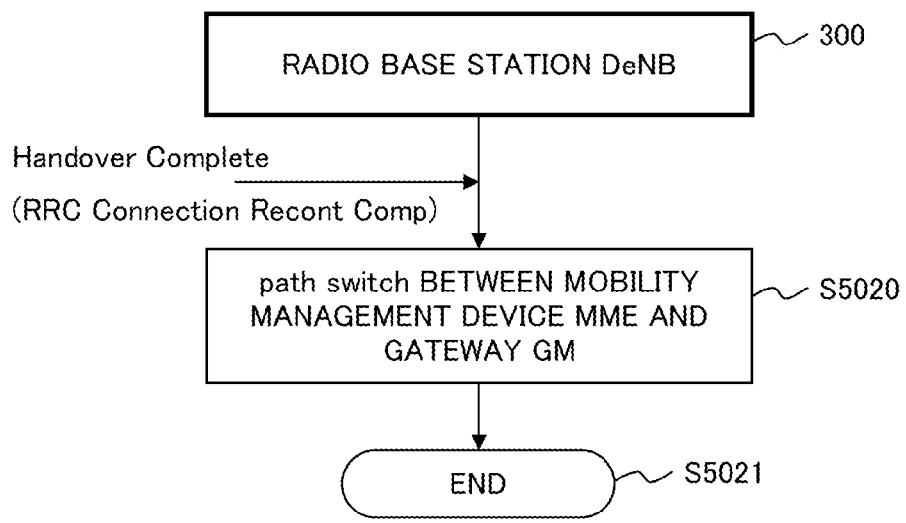

message is received until a "handover request acknowledgment" message is transmitted;

FIG. 22 is a flowchart illustrating operations of the relay node RN from when the "handover request acknowledgment" message is received until a "handover complete" message is transmitted; and FIG. 23 is a flowchart illustrating operations of the radio base station DeNB from when the "handover complete" message is received until path switching is complete.

DESCRIPTION OF EMBODIMENTS

An embodiment is described in detail below with reference to the drawings.

The following embodiment is described by taking, as an example, a case where the present invention is applied to specifications of an LTE-Advanced system currently under study in 3GPP. However, the embodiment is not intended to limit to the case where the present invention is applied to the specifications of the LTE-Advanced system.

FIG. 4 illustrates a configuration example of a radio communication system according to the embodiment.

The radio communication system illustrated in FIG. 4 includes a mobile station UE 10-1, a relay node RN 20, a first radio base station S-DeNB 30s, a second radio base station T-DeNB 30t, a first mobility management device MME 40, and a gateway GW 50.

In FIG. 4, the mobile station UE 10-1 is present within a communication area of the relay node RN 20, and connected to the relay node RN 20. In FIG. 4, the relay node RN 20 is connected to one mobile station UE 10-1 present within the communication area. However, the relay node RN 20 is connectable to a plurality of mobile stations UEs 10-1 to 10-n (n is an arbitrary integer) within the communication area.

The relay node RN 20 is present within a communication area of the first radio base station S-DeNB 30s, and connected to the first radio base station S-DeNB 30s.

The first radio base station S-DeNB 30s is connected to each of the first mobility management device MME 40 and the gateway GW 50. The second radio base station T-DeNB 30t is connected to each of the first mobility management device MME 40 and the gateway GW 50. The first mobility management device MME 40 and the gateway GW 50 are nodes included in a core network called EPC.

In the configuration example of the radio communication system illustrated in FIG. 4, the first radio base station S-DeNB 30s and the second radio base station T-DeNB 30t are connected to the same first mobility management device MME 40. However, unlike the configuration example of the radio system illustrated in FIG. 4, the second radio base station T-DeNB 30t may be connected to a second mobile management device MME different from that of the first radio base station S-DeNB 30s depending on an embodiment.

In the radio communication system illustrated in FIG. 4, user data of the mobile stations UEs 10-1 to 10-n under the control of the relay node RN 20 are forwarded to the relay node RN 20 via the gateway GW 50 and the radio base station S-DeNB 30s as indicated by a path p11.

In the embodiment, the relay node RN 20, the first radio base station S-DeNB 30s, the second radio base station T-DeNB 30t, and the first mobility management device MME 40 execute processes referred to in the following (1) to (6).

(1) The relay node RN 20 manages all the mobile stations UEs 10-1 to 10-n which are present within the communication area and currently under communication. The relay node RN 20 captures instance information and context information of the respective mobile stations UEs 10-1 to 10-n while an RRC connection and E-RAB setting which are made when a communication of each of the mobile stations UEs 10-1 to 10-n is started, are being performed. Then, the relay node RN 20 stores the captured instance information and context information for each of the mobiles stations UEs. Namely, the relay node RN 20 associates the context information of each of the mobile stations UEs 10-1 to 10-n with the instance information of each of the mobile stations UEs 10-1 to 10-n, and stores the information.

In the meantime, the relay node RN 20 releases the instance information and the context information of a target one of the mobile stations UEs 10-1 to 1-n when E-RAB is released. E-RAB is released by a terminated call, an occurrence of an abnormality such as a radio link failure (RLF), or the like, a move of the mobile stations UEs 10-1 to 10-n from under the control of the relay node RN 20 to under the control of another relay node or a radio base station T-DeNB, or other factors.

(2) The relay node RN 20 detects degradation of radio quality between the first radio base station S-DeNB 30s and the relay node RN 20 due to the move of the relay node RN 20.

(3) Assume a case where the first radio base station S-DeNB 30s and the second radio base station T-DeNB 30t are connected to the same first mobility management device MME 40 and an X2 interface is established between the first radio base station S-DeNB 30s and the second radio base station T-DeNB 30t as in the configuration example of the radio communication system illustrated in FIG. 4. This case is hereinafter referred to as an X2 handover case for the sake of convenience.

In the X2 handover case, the relay node RN 20 executes an X2-based handover process for the relay node RN 20 by using, as timing, detection of degradation of radio quality in the relay node RN 20 in the above described (2) with the use of a function included in the relay node RN 20 similar to the function of the mobile station UE.

Additionally, the relay node RN 20 starts a handover process for the mobile stations UEs 10-1 to 10-n based on the detection of the degradation of radio quality in the relay node RN 20 in the above described (2) without using, as timing, the reception of a "radio environment measurement report" message from the mobile stations UEs 10-1 to 10-n.

Namely, the relay node RN 20 generates a handover control signal for the mobile stations UEs 10-1 to 10-n based on the information (the instance information and the context information which are obtained with the process in the above described (1)) of all the mobile stations UEs 10-1 to 10-n currently under communication. Then, the relay node RN 20 notifies the second radio base station T-DeNB 30t of the generated handover control signal.

Note that the autonomous notification of the handover control signal for all the mobile stations UEs 10-1 to 10-n currently under communication may be made for each of the mobile stations UEs. Moreover, the autonomous notification may be made by bundling handover control signals for all the mobile stations UEs 10-1 to 10-n into one.

(4) Assume a case where the second radio base station T-DeNB 30t is connected to a second mobility management device MME different from that of the first radio base station S-DeNB 30s and an X2 interface is not established between the first radio base station S-DeNB 30s and the second radio base station T-DeNB 30t unlike the assumption of the above described (3). This case is hereinafter referred to as an S1 handover case for the sake of convenience.

In the S1 handover case, the relay node RN 20 executes an S1-based handover process for the relay node RN 20 by using, as timing, the detection of degradation of radio quality in the relay node RN 20 in the above described (2) with the use of a function included in the relay node RN 20 similar to the function of the mobile station UE.

Additionally, the relay node RN 20 starts a handover process for the mobile stations UEs 10-1 to 10-n based on the detection of the degradation of radio quality in the relay node RN 20 in the above described (2) without using, as timing, the reception of the "radio environment measurement report" message from the mobile stations UEs 10-1 to 10-n.

Namely, the relay node RN 20 generates a handover control signal based on the information (the instance information and the context information which are obtained in the process in the above described (1)) of all the mobile stations UEs 10-1 to the 10-n currently under communication. Then, the relay node RN 20 notifies the first mobility management device MME 40 of the generated handover control signal.

(5) During the handover process, the relay node RN 20 prevents the user data of the mobile stations UEs 10-1 to 10-n from being forwarded respectively to the second radio base station T-DeNB 30t.

Accordingly, in the X2 handover case in the above described (3), the relay node RN 20 does not start the forwarding process of the user data to the second radio base station T-DeNB 30t even if the relay node RN 20 receives the handover control signal for the mobile stations UEs 10-1 to 10-n from the second radio base station T-DeNB 30t. Moreover, in the S1 handover case in the above described (4), the relay node RN 20 does not start the forwarding of the user data to the second radio base station T-DeNB 30t even if the relay node RN 20 receives the handover control signal for the mobile stations UEs 10-1 to 10n from the first mobility management device MME 40.

However, assume that degradation of radio quality between the relay node RN 20 and a mobile station UE 10-x (x is an arbitrary integer equal to or smaller than n) occurs and the mobile station UE 10-x that the relay node RN 20 decides to hand over to a third radio base station T-DeNB different from the second radio base station T-DeNB 30t is present. In this case, the relay node RN 20 forwards user data of the mobile station UE 10-x to the third radio base station T-DeNB when the relay node RN 20 executes a process for handing over the mobile station UE 10-x to the third radio base station T-DeNB.

(6) The second radio base station T-DeNB 30t executes a handover process for the mobile stations UEs 10-1 to 10-n upon receipt of the handover control signal from the relay node RN 20 (the X2 handover case in the above described (3)). Alternatively, the first mobility management device MME 40 executes the handover process for the mobile stations UEs 10-1 to 10-n upon receipt of the handover control signal from the relay node RN 20 (the S1 handover case in the above described (4)).

In the handover process in the above described (1) to (6), the relay node RN 20 executes the handover process for the relay node RN 20 upon detection of the degradation of radio quality between the relay node RN 20 and the first radio base station S-DeNB 30s. Moreover, the relay node RN 20 autonomously executes the handover process for the mobile stations UEs 10-1 to 10-n by using, as timing, the detection of the degradation of radio quality between the relay node RN 20 and the first radio base station S-DeNB 30s.

Namely, the relay node RN 20 starts the handover process for the mobile stations UEs 10-1 to 10-n based on the information stored for the mobile stations UEs 10-1 to 10-n currently under communication. Moreover, the relay node RN 20 does not forward the user data of the mobile stations UEs 10-1 to 10-n during the handover process for the mobile stations UEs 10-1 to 10-n as are evident from the forwarding paths p11 to p13 of the user data illustrated in FIG. 4.

Figure 1:
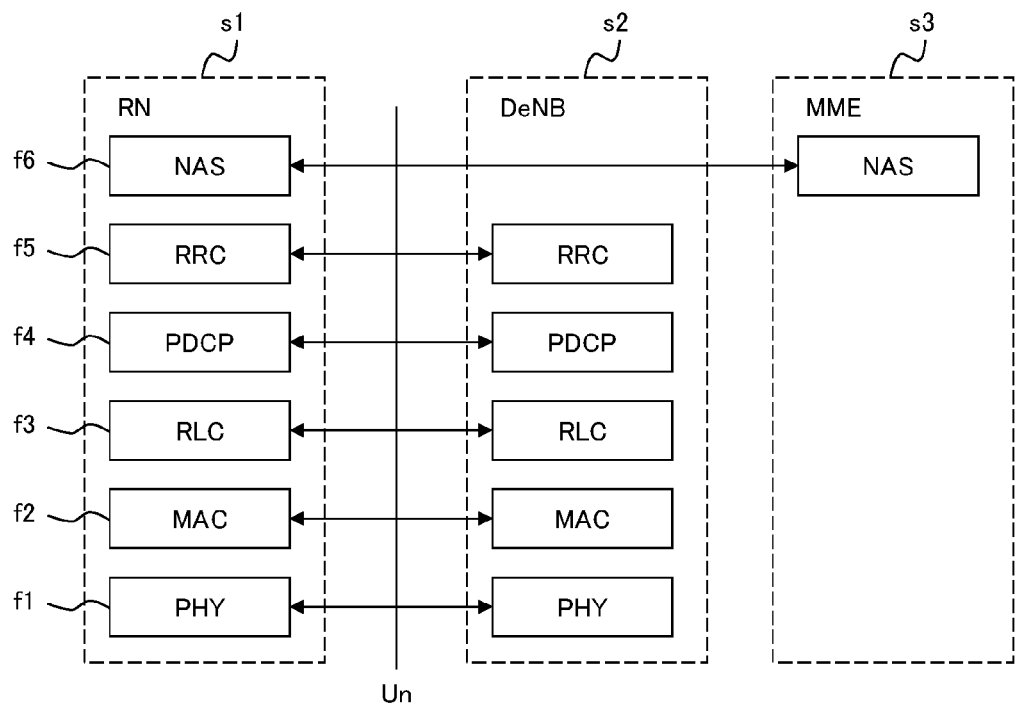
FIG. 1 is an explanatory diagram of a protocol stack of a control plane, which supports a relay node RN.
Figure 2:
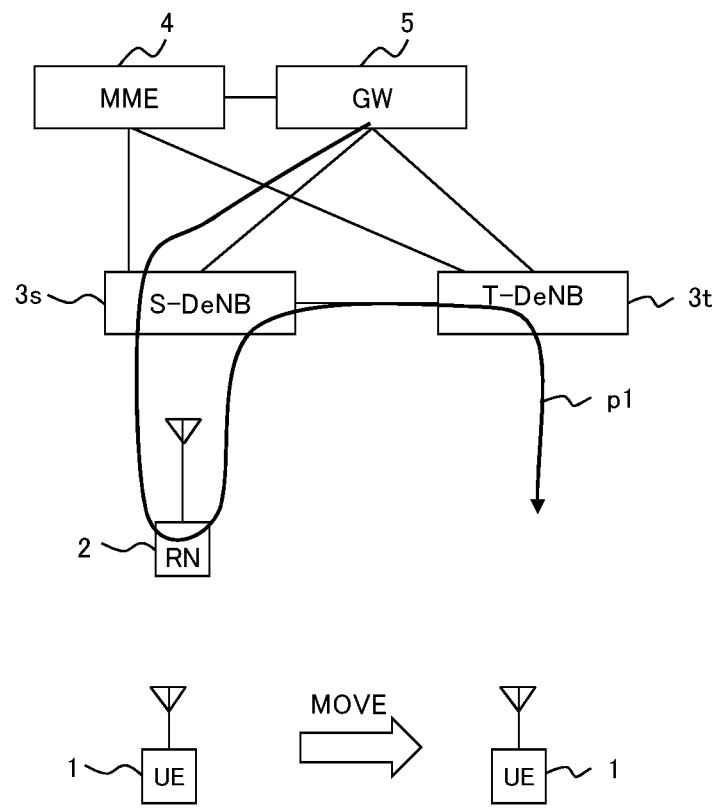
FIG. 2 is an explanatory diagram of a first case where the handover control procedure standardized in 3GPP is applied.
Figure 3:
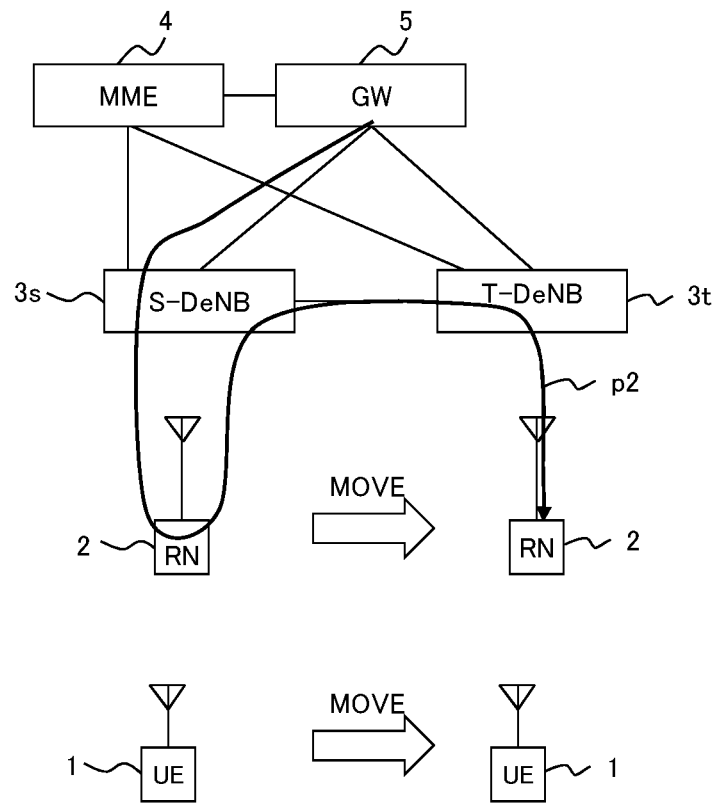
FIG. 3 is an explanatory diagram of a second case where the handover control procedure standardized in 3GPP is applied.

Therefore, according to the embodiment, unneeded forwarding of user data from and to the same relay node RN 20 is eliminated unlike the above described case where the handover control procedure is executed with reference to FIG. 3, whereby the forwarding of the user data can be efficiently performed.

The handover control procedure according to the embodiment is described with reference to FIGS. 5 to 8.

Sequences described with reference to FIGS. 5 to 8 are merely examples, and do not need to be always processed in time series. The sequences may include processes that may be executed in parallel or individually. Moreover, the handover control procedure according to the embodiment does not preclude additions of processes that are not illustrated in FIGS. 5 to 8.

FIG. 5 is a sequence diagram of the handover control according to the embodiment until the mobile station UE starts a communication.

In FIG. 5, the relay node RN 20 is registered (attached) to E-UTRAN and EPC, and connected to the first radio base station S-DeNB 30s and the first mobility management device MME 40 (S1001). Moreover, a connection state between the mobile stations UEs 10-1 to 10-n and the relay node RN 20 is a radio resource control (RRC) idle state (S1002).

The mobile stations UEs 10-1 to 10-n detect the relay node RN 20 with a cell search process, and respectively transmit a "radio resource control connection request (RRC Connection Request)" message to the relay node RN 20 by using resources allocated by the relay node RN 20 (S1003).

The relay node RN 20 captures an instance of each of the mobile stations UEs 10-1 to 10-n, such as a cell radio network temporary identifier (C-RNTI), and stores the captured instance for each of the mobile stations UEs (S1004).

The cell radio network temporary identifier is an identifier of each of the mobile stations UEs 10-1 to 10-n, which is assigned for a control. Instance such as the cell radio network temporary identifier is maintained while a radio resource control is established.

The relay node RN 20 transmits a "radio resource control connection setup (RRC Connection Setup)" message to each of the mobile stations UEs 10-1 to 10-n (S1005).

The mobile stations UEs 10-1 to 10-n respectively transmit a "radio resource control connection setup completion (RRC Connection Setup Complete)" message to the relay node RN 20 (S1006).

The relay node RN 20 transmits an "initial UE message" respectively for the mobile stations UEs 10-1 to 10-n to the first mobility management device MME 40 (S1007).

After an authentication process and a security process are executed between each of the mobile stations UEs 10-1 to 10-n and the first mobility management device MME 40, the first mobility management device MME 40 executes a registration process respectively for the mobile stations UEs 10-1 to 10-n. Then, the first mobility management device MME transmits an "initial context setup request" message respectively for the mobile stations UEs 10-1 to 10-n to the relay node RN 20 (S1008).

The relay node RN 20 stores, for each of the mobile stations UEs 10-1 to 10-n, the context information of the mobile stations UEs 10-1 to 1-n respectively notified from the first mobility management device MME 40 with the "initial context setup request" message for the mobile stations UEs 10-1 to 10-n (S1009). Namely, the relay node RN 20 associates the context information of each of the mobile stations 10-1 to 10-n with the instance of each of the mobile stations UEs 10-1 to 10-n, and stores the context information and the instance.

The context information of each of the mobile stations UEs 10-1 to 10-n, which is stored in the relay node RN 20, includes S1-MME interface UE identification information (MME UE S1AP ID), UE security functions (UE Security Capabilities), a UE aggregate maximum bit rate, E-RAB identification information (E-RAB ID), E-RAB level QoS parameters, and an uplink GTP (GPRS Tunneling Protocol) tunnel endpoint (UL GTP Tunnel Endpoint).

The relay node RN 20 transmits a "UE capability enquiry" message to each of the mobile stations UEs 10-1 to 10-n (S1010).

The mobile stations UEs 10-1 to 10-n respectively transmit a "UE capability information" message to the relay node RN 20 (S1011).

The relay node RN 20 transmits a "UE capability information instruction (UE Capability Info Indication)" message respectively for the mobile stations UEs 10-1 to 10-n to the first mobility management device MME 40 (S1012).

The relay node RN 20 transmits a security mode command (Security Mode Command) to each of the mobile stations UEs 10-1 to 10-n (S1013).

The mobile stations UEs 10-1 to 10-n respectively transmit a "security mode completion (Security Mode Complete)" message to the relay node RN 20 (S1014).

The relay node RN 20 transmits a "radio resource control connection reconfiguration (RRC Connection Reconfiguration)" message to each of the mobile stations UEs 10-1 to 10-n (S1015).

The mobile stations UEs 10-1 to 10-n respectively transmit a "radio resource control connection reconfiguration completion (RRC Connection Reconfiguration Complete)" message to the relay node RN 20 (S1016).

The relay node RN 20 transmits an "initial context setup response" message respectively for the mobile stations UEs 10-1 to 10-n to the first mobility management device MME (S1017).

The first mobility management device MME 40 transmits an "E-RAB setup request" message respectively for the mobile stations UEs 10-1 to 10-n to the relay node RN 20 (S1018).

The relay node RN 20 transmits a "radio resource control connection reconfiguration" message to each of the mobile stations UEs 10-1 to 10-n (S1019).

The mobile stations UEs 10-1 to 10-n respectively transmit a "radio resource control connection reconfiguration completion" message to the relay node RN 20 (S1020).

The relay node RN 20 transmits an "E-RAB setup response" message respectively for the mobile stations UEs 10-1 to 10-n to the first mobility management device MME 40 (S1021).

When the radio resource control (RRC) and E-RAB are set in this way, the mobile stations UEs 10-1 to 10-n respectively start a communication via the relay node RN 20, the first radio base station S-DeNB 30s, and the first mobility management device MME 40 (S1022).

As described above, the relay node RN 20 stores the instance of each of the mobile stations UEs 10-1 to 10-n currently under communication for each of the mobile stations UEs 10-1 to 10-n in this embodiment. Moreover, the relay node RN 20 stores the context information of each of the mobile stations UEs 10-1 to 10-n, which is notified from the first mobility management device MME 40 with the "initial context setup request" message respectively for the mobile stations UEs 10-1 to 10-n, for each of the mobile stations UEs.

FIG. 6 is a sequence diagram of the handover control according to the embodiment in the X2 handover case.

The sequence diagram of the handover control illustrated in FIG. 6 depicts a sequence subsequent to the state where the mobile stations UEs 10-1 to 10-n are currently under communication (step S1022 of FIG. 5).

Assume that the mobile stations UEs 10-1 to 10-n and the relay node RN 20 move from the communication area of the first radio base station S-DeNB 30s to the communication area of the second radio base station T-DeNB while the mobile stations UEs 10-1 to 10-n are currently under communication (S2001).

The relay node RN 20 detects that radio quality between the relay node RN 20 and the first radio base station S-DeNB 30s is degraded (S2002). Then, the relay node RN 20 transmits a "radio environment measurement report (Measurement Report)" message of the relay node RN 20 to the first radio base station S-DeNB 30s (S2003).

The first radio base station S-DeNB 30s decides a handover of the relay node RN 20 to the second radio base station T-DeNB 30t. Then, the first radio base station S-DeNB 30s transmits a "handover request" message for the relay node RN 20 to the second radio base station T-DeNB 30t (S2004).

The relay node RN 20 extracts the instance information and the context information, which are stored in the relay node RN 20 (the information stored in S1004 and S1005 of FIG. 5), of each of the mobile stations UEs 10-1 to 10-n currently under communication. Then, the relay node RN 20 decides a handover of the mobile stations UEs 10-1 to 10-n currently under communication to the second radio base station T-DeNB 30t, and autonomously starts a handover process respectively for the mobile stations UEs 10-1 to 10-n currently under communication (S2005).

The relay node RN 20 generates a "handover request" message for the mobile stations UEs 10-1 to 10-n based on the extracted instance information and context information. Then, the relay node RN 20 transmits the generated "handover request" message to the second radio base station T-DeNB 30t (S2006). At this time, the relay node RN 20 may bundle the "handover request" messages respectively for the mobile stations UEs 10-1 to 10-n into one message, and transmit the bundled message.

The relay node RN 20 prevents the user data of the mobile stations UEs 10-1 to 10-n currently under communication from being respectively forwarded (S2007).

The second radio base station T-DeNB 30t transmits a "handover request acknowledgment (Handover Request Ack)" message for the relay node RN 20 to the first radio base station S-DeNB 30s (S2008).

Additionally, the second radio base station T-DeNB 30t transmits a "handover request acknowledgment" message respectively for the mobile stations UEs 10-1 to 10-n to the relay node RN 20 (S2009). At this time, the second radio base station T-DeNB 30t may bundle the "handover request response" messages respectively for the mobile stations UEs 10-1 to 10-n into one message, and transmit the bundled message.

In S2007, the relay node RN 20 prevents the user data of the mobile stations UEs 10-1 to 10-n from being respectively forwarded. Accordingly, the relay node RN 20 does not start the forwarding process of the user data to the second radio base station T-DeNB 30t even if the relay node RN 20 receives the "handover request acknowledgment" message for the mobile stations UEs 10-1 to 10-n from the second radio base station T-DeNB 30t.

The first radio base station S-DeNB 30s transmits a "radio resource control connection reconfiguration (RRC Connection Reconf)" message for the relay node RN 20 to the relay node RN 20 (S2010).

The relay node RN 20 transmits a "handover completion (handover Complete)" message (a "radio resource control connection reconfiguration completion (RRC connection Reconf Comp)" message)) for the relay node RN 20 to the second radio base station T-DeNB 30t (S2011).

Additionally, the relay node RN 20 transmits a "handover completion" message (a "radio resource control connection reconfiguration completion" message) respectively for the mobile stations UEs 10-1 to 10-n to the second radio base station T-DeNB 30t (S2012).

The second radio base station T-DeNB 30t transmits a "path switching request (Path Switch Request)" message for the relay node RN 20 to the first mobility management device MME 40 (S2013).

Additionally, the second radio base station T-DeNB 30t transmits the "path switching request", message respectively for the mobile stations UEs 10-1 to 10-n to the first mobility management device MME 40 (S2014).

The first mobility management device MME 40 receives a "bearer change request (Modify Bearer Request)" message for the relay node RN 20 to the gateway GW 50. Moreover, the first mobility management device MME 40 receives a "bearer change response (Modify Bearer Response)" message for the relay node RN 20 from the gateway GW 50. Then, the first mobility management device MME 40 transmits a "path switching request acknowledgment (Path Switch Request Ack)" message for the relay node RN 20 to the second radio base station T-DeNB 30t (S2015).

Furthermore, the first mobility management device MME 40 transmits a "bearer change request" message respectively for the mobile stations UEs 10-1 to 10-n to the gateway GW 50. Moreover, the first mobility management device MME 40 receives, from the gateway 50, a "bearer change response" message respectively for the mobile stations UEs 10-1 to 10-n. Then, the first mobility management device MME 40 transmits, to the second radio base station T-DeNB 30t, a "path switching request acknowledgment" message respectively for the mobile stations UEs 10-1 to 10-n (S2016).

The second radio base station T-DeNB 30t transmits an "RN context release" message for the relay node RN 20 to the first radio base station S-DeNB 30s (S2017). The first radio base station S-DeNB 30s releases the context of the relay node RN 20.

With the handover control sequence illustrated in FIG. 6, the relay node RN 20 executes the handover process for the relay node RN 20 upon detection of degradation of radio quality between the relay node RN 20 and the first radio base station S-DeNB 30s. Moreover, the relay node RN 20 autonomously executes the handover process for the mobile stations UEs 10-1 to 10-n by using, as timing, detection of the degradation of radio quality between the relay node RN 20 and the first radio base station S-DeNB 30s.

Namely, the relay node RN 20 autonomously starts the handover process respectively for the mobile stations UEs 10-1 to 10-n based on the stored information of the mobile stations UEs 10-1 to 10-n currently under communication.

Additionally, the relay node RN 20 prevents the user data of the mobile stations UEs 10-1 to 10-n currently under communication from being respectively forwarded. As a result, the relay node RN 20 does not forward the user data even if the relay node RN 20 receives the "handover request acknowledgment" message for the mobile stations UEs 10-1 to 10-n from the second radio base station T-DeNB 30t.

Therefore, according to the embodiment, unneeded forwarding of user data from and to the same relay node RN 20 can be prevented when the mobile stations UEs 10-1 to 10-n and the relay node RN 20 are handed over, whereby the forwarding process of user data can be made efficient.

FIG. 7 is a sequence diagram of the handover control according to the embodiment in the S1 handover case.

A second mobility management device MME 41 illustrated in FIG. 7 indicates a mobility management device MME connected to the second radio base station T-DeNB 30t. Namely, in the S1 handover case illustrated in FIG. 7, the first radio base station S-DeNB 30s is connected to the first mobility management device MME 40, and the second radio base station T-DeNB 30t is connected to the second mobility management device MME 41 different from the first mobility management device MME 40.

The sequence diagram of the handover control illustrated in FIG. 7 depicts a sequence subsequent to the state where the mobile stations UEs 10-1 to 10-n are currently under communication.

Assume that the mobile stations UEs 10-1 to 10-n and the relay node RN 20 move from the communication area of the first radio base station S-DeNB 30s to the communication area of the second radio base station T-DeNB while the mobile stations UEs 10-1 to 10-n are currently under communication (S3001).

The relay node RN 20 detects that the radio quality between the relay node RN 20 and the first radio base station S-DeNB 30s is degraded (S3002). Then, the relay node RN 20 transmits a "radio environment measurement report (Measurement Report)" message of the relay node RN 20 to the first radio base station S-DeNB 30s (S3003).

The first radio base station S-DeNB 30s decides a handover of the relay node RN 20 to the second radio base station T-DeNB 30t. Then, the first radio base station S-DeNB 30s transmits a "handover execution request (Handover Required)" message for the relay node RN 20 to the first mobility management device MME 40 (S3004).

The relay node RN 20 extracts the instance information and the context information (the information stored in S1004 and S1009 of FIG. 5), stored in the relay node RN 20, of each of the mobile stations UEs 10-1 to 10-n currently under communication. Then, the relay node RN 20 decides a handover of the mobile stations UEs 10-1 to 10-n currently under communication to the second radio base station T-DeNB 30t, and autonomously starts a handover process respectively for the mobile stations UEs 10-1 to 10-n currently under communication (S3005).

The relay node RN 20 generates a "handover execution request (Handover Required)" message for the mobile stations UEs 10-1 to 10-n based on the extracted instance information and context information. The relay node RN 20 transmits the generated "handover execution request" message to the first mobility management device MME 40 (S3006).

The first mobility management device MME 40 transmits a "forward relocation request" message for the relay node RN 20 to the second mobility management device MME 41 (S3007).

Additionally, the first mobility management device MME 40 transmits a "forward relocation request" message respectively for the mobile stations UEs 10-1 to 10-n to the second mobility management device MME 41 (S3008).

The second mobility management device MME 41 transmits a "handover request" message for the relay node RN 20 to the second radio base station T-DeNB 30t (S3009).

Additionally, the second mobility management device MME 41 transmits a "handover request" message respectively for the mobile stations UEs 10-1 to 10-n to the second radio base station T-DeNB 30t (S3010).

The second radio base station T-DeNB 30t transmits a "handover request acknowledgment (Handover Request Ack)" message for the relay node RN 20 to the second mobility management device MME 41 (S3011).

Additionally, the second radio base station T-DeNB 30t transmits a "handover request acknowledgment" message respectively for the mobile stations UEs 10-1 to 10-n to the second mobility management device MME 41 (S3012).

The second mobility management device MME 41 transmits a "forward relocation response" message for the relay node RN 20 to the first mobility management device MME 40 (S3013).

Additionally, the second mobility management device MME 41 transmits a "forward relocation response" message respectively for the mobile stations UEs 10-1 to 10-n to the first mobility management device MME 40 (S3014).

The first mobility management device MME 40 transmits a "handover command" message for the relay node RN 20 to the first radio base station S-DeNB 30s (S3015).

Furthermore, the first mobility management device MME 40 transmits a "handover command" message respectively for the mobile stations UEs 10-1 to 10-n to the relay node RN 20 (S3016).

The first radio base station S-DeNB 30s transmits a "handover command" message for the relay node RN 20 to the relay node RN 20 (S3017).

The relay node RN 20 prevents the user data of the mobile stations UEs 10-1 to 10-n currently under communication from being respectively forwarded (S3018). Accordingly, the relay node RN 20 does not start the forwarding of the user data to the second radio base station T-DeNB 30t even if the relay node RN 20 receives, from the first mobility management device MME 40, the "handover command" message respectively for the mobile stations UEs 10-1 to 10-n.

The relay node RN 20 transmits a "handover completion confirmation (Handover Confirm)" message for the relay node RN 20 to the second radio base station T-DeNB 30t (S3019).

Additionally, the relay node RN 20 transmits a "handover completion confirmation" message respectively for the mobile stations UEs 10-1 to 10-n to the second radio base station T-DeNB 30t (S3020).

The second radio base station T-DeNB 30t transmits a" handover completion notification (Handover Notify)" message for the relay node RN 20 to the second mobility management device MME 41 (S3021).

Additionally, the second radio base station T-DeNB 30t transmits a "handover completion notification" message respectively for the mobile stations UEs 10-1 to 10-n to the second mobility management device MME 41 (S3022).

The second mobility management device MME 41 transmits a "forward relocation completion" message for the relay node RN 20 to the first mobility management device MME (S3023).

Additionally, the second mobility management device MME 41 transmits a "forward relocation completion" message respectively for the mobile stations UEs 10-1 to 10-n to the first mobility management device MME 40 (S3024).

The first mobility management device MME 40 transmits a "forward relocation completion acknowledgment (Forward Relocation Complete Ack)" message for the relay node RN 20 to the second mobility management device MME 41 (S3025).

Furthermore, the first mobility management device MME 40 transmits a "forward relocation completion acknowledgment" message respectively for the mobile stations UEs 10-1 to 10-n to the second mobility management device MME (S3026).

The first mobility management device MME 40 transmits an "RN resource release (RN Release Resource)" message to the first radio base station S-DeNB 30s (S3027). The first radio base station S-DeNB 30s releases resources for the relay node RN 20.

With the handover control sequence illustrated in FIG. 7, the relay node RN 20 executes the handover process for the relay node RN 20 upon detection of degradation of radio quality between the relay node RN 20 and the first radio base station S-DeNB 30s. Moreover, the relay node RN 20 autonomously executes the handover process for the mobile stations UEs 10-1 to 10-n by using, as timing, the detection of degradation of radio quality between the relay node RN 20 and the first radio base station S-DeNB 30s.

Namely, the relay node RN 20 autonomously starts the handover process respectively for the mobile stations UEs 10-1 to 10-n based on the stored information of the mobile stations UEs 10-1 to 10-n currently under communication.

Additionally, the relay node RN 20 prevents the user data of the mobile stations UEs 10-1 to 10-n currently under communication from being respectively forwarded. As a result, the relay node RN 20 does not forward the user data even if the relay node RN 20 receives the "handover command" message respectively for the mobile stations UEs 10-1 to 10-n from the first mobility management device MME 40.

Therefore, according to the embodiment, unneeded forwarding of user data from and to the same relay node 20 is prevented when the mobile stations UEs 10-1 to 10-n and the relay node RN 20 are handed over, whereby the forwarding process of user data can be made efficient.

FIG. 8 is a flowchart illustrating the handover process of the relay node RN 20 upon receipt of the radio environment measurement report from the mobile station UE.

A case where the "radio environment measurement report (Measurement Report)" message is transmitted from the mobile station UE 10-x among the mobile stations UEs 10-1 to 10-n to the relay node RN 20 during the handover process described above with reference to FIGS. 6 and 7 is described below.

When the mobile stations UEs 10-1 to 10-n, which are connected to the relay node RN 20 mounted in a moving vehicle and are currently under communication, move along with the relay node RN 20, an optimum connection destination node for the mobile stations UEs 10-1 to 10-n after the move is still the relay node RN 20 in many cases.

However, based on the "radio environment measurement report" message transmitted from the mobile station UE 10-x, the second radio base station T-DeNB 30t outside the moving vehicle, or a third radio base station T-DeNB different from the second radio base station T-DeNB 30t can be assumed to be the optimum connection destination node after the move.

Accordingly, in this embodiment, the relay node RN 20 executes the handover process for the mobile station UE 10-x as represented by a process flow illustrated in FIG. 8 based on the "radio environment measurement report" message received from the mobile station UE 10-x during the handover control process.

In step S4001 of FIG. 8, the relay node RN 20 moves from the communication area of the first radio base station S-DeNB 30s to the communication area of the second radio base station T-DeNB 30t along with the mobile stations UEs 10-1 to 10-n currently under communication. Step S4001 is equivalent to, for example, S2001 of FIG. 6 and step S3001 of FIG. 7.

The relay node RN 20 starts the handover process of the relay node RN 20 from the first radio base station S-DeNB 30s to the second radio base station T-DeNB 30t (S4002). The process in S4002 of FIG. 8 is equivalent to, for example, the processes in steps S2002 and S2003 of FIG. 6, and those in steps S3002 and S3003 of FIG. 7.

The relay node RN 20 autonomously starts the handover process respectively for the mobile stations UEs 10-1 to 10-n (S4003). The process in step S4003 of FIG. 8 is equivalent to, for example, the processes in steps S2005 and S2006 of FIG. 6, and the processes in steps S3005 and S3006 of FIG. 7.

The relay node RN 20 prevents the process for respectively forwarding the user data of the mobile stations UEs 10-1 to 10-n currently under communication to the second radio base station T-DeNB 30t from being executed (S4004). The process in step S4004 of FIG. 8 is equivalent to, for example, the process in step S2007 of FIG. 6, and the process in step S3018 of FIG. 7.

Assume that the relay node RN 20 receives the "radio environment measurement report" message from the mobile station UE 10-x among the mobile stations UEs 10-1 to 10-n after the process in step S4004 as illustrated in FIG. 8, for example.

The relay node RN 20 determines whether to hand over the mobile station UE 10-x to either the second radio base station T-DeNB 30t or the third radio base station T-DeNB based on the "radio environment measurement report" message received from the mobile station UE 10-x (S4005).

If the relay node RN 20 determines to hand over the mobile station UE 10-x to the second radio base station T-DeNB 30t ("NO" in step S4005), the relay node RN 20 executes the process for handing over the mobile stations UEs 10-1 to 10-n including the mobile station UE 10-x to the second radio base station T-DeNB 30t (S4006). The process in step S4006 of FIG. 8 is equivalent to, for example, the process in step S2012 of FIG. 6 and the process in step S3020 of FIG. 7.

In the meantime, if the relay node RN 20 determines to hand over the mobile station UE 10-x to the third radio base station T-DeNB ("YES" in step S4005), the relay node RN 20 executes the process for handing over the mobile station UE 10-x to the third radio base station T-DeNB (S4007).

Namely, assume that the third radio base station T-DeNB connects to the same first mobility management device MME 40 as that of the first radio base station S-DeNB and an X2 connection is established between the first radio base station S-DeNB and the third radio base station T-DeNB. In this case, the relay node RN 20 transmits a "handover request" message to the third radio base station T-DeNB, and executes an X2-based handover process for the mobile station UE 10-x.

Also assume that the third radio base station T-DeNB connects to the third mobility management device MME different from that of the first radio base station S-DeNB and an X2 connection is not established between the first radio base station S-DeNB and the third radio base station T-DeNB. In this case, the relay node RN 20 transmits a "handover execution request (Handover Required)" message to the third mobility management device MME, and executes the S1-based handover process for the mobile station UE 10-x.

With the process for handing over the mobile station UE 10-x to the third radio base station T-DeNB, the relay node RN 20 forwards the user data of the mobile station UE 10-x, which is prevented from being forwarded in step S4004, to the third radio base station T-DeNB.

In addition, if the determination in step S4005 results in "YES", the relay node RN 20 executes the process for handing over the mobile stations UEs 10-1 to 10-n other than the mobile station UE 10-x to the second radio base station T-DeNB 30t (S4008). The process in step S4008 of FIG. 8 is equivalent to, for example, the process in step S2012 of FIG. 6 for the mobile stations UEs 10-1 to 1-n other than the mobile station UE 10-x, and the process in step S3020 of FIG. 7 for the mobile stations UEs 10-1 to 10-n other than the mobile station UE 10-x.

The relay node RN 20 executes the handover process for the relay node RN 20 to the second radio base station T-DeNB 30t (S4009). The process in step S4009 of FIG. 8 is equivalent to, for example, the process in step S2011 of FIG. 6, and the process in step S3019 of FIG. 7.

In this way, the relay node RN 20 completes the handover process respectively for the relay node RN 20 and the mobile stations UEs 10-1 to 10-n currently under communication (S4010).

Assume that the relay node RN 20 determines to hand over the mobile station UE 10-x to the second radio base station T-DeNB 30t based on the "radio environment measurement report" message from the mobile station UE 10-x as described above. In this case, the relay node RN 20 executes the handover process also for the mobile station UE 10-x to the second radio base station T-DeNB 30t similarly to the other mobile stations UEs 10-1 to 10-n. As a result, the mobile station UE 10-x performs a communication via the relay node RN 20 and the second radio base station T-DeNB 30t similarly to the other mobile stations UEs 10-1 to 10-n.

Also assume that the relay node RN 20 determines to hand over the mobile station UE 10-x to the third radio base station T-DeNB based on the "radio environment measurement report" message from the mobile station UE 10-x. In this case, the relay node RN 20 executes the handover process for the mobile station UE 10-x to the third radio base station T-DeNB. As a result, after the handover is performed, the mobile station UE 10-x performs a communication via the third radio base station T-DeNB unlike the other mobile stations UEs 10-1 to 10-n.

Figure 9:
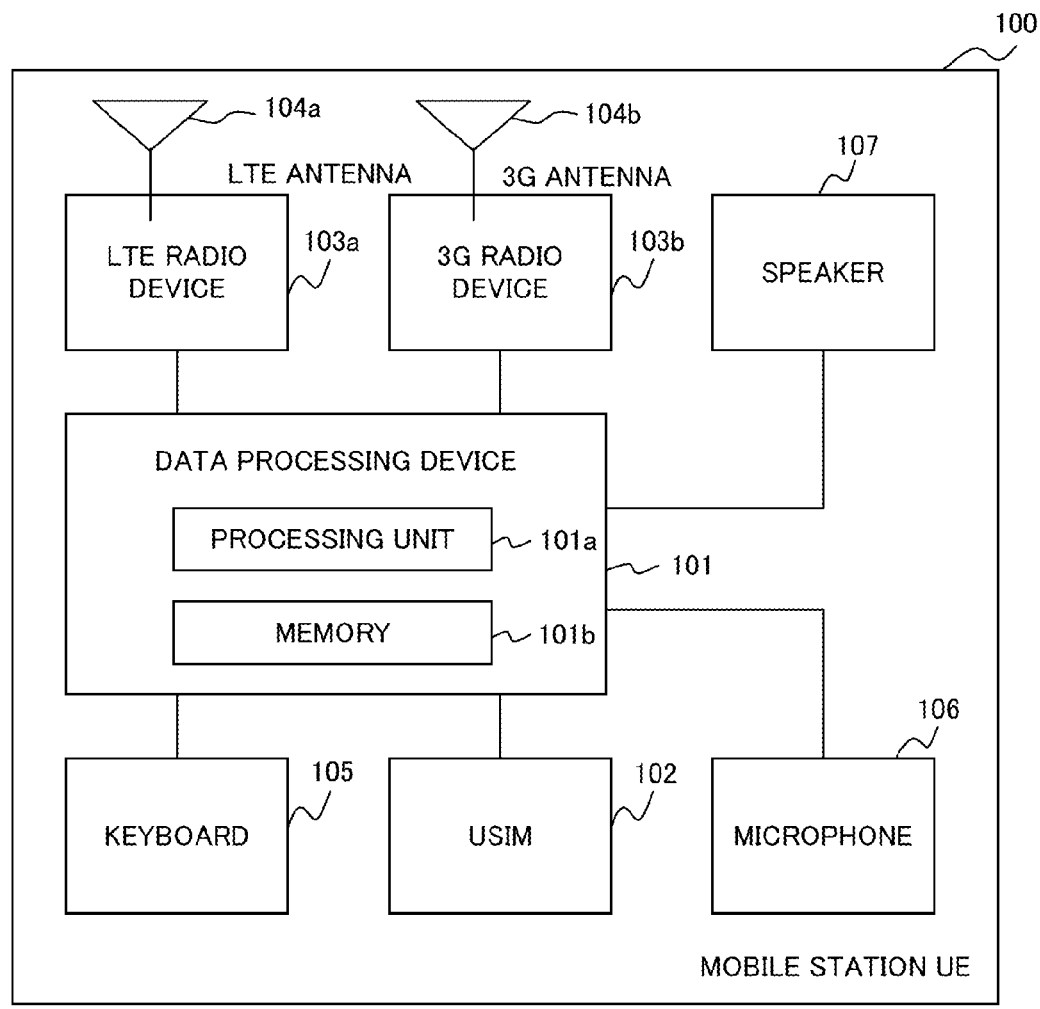
FIG. 9 illustrates a hardware configuration of the mobile station UE according to the embodiment.

FIG. 9 illustrates a hardware configuration of the mobile station UE according to the embodiment.

The mobile station UE 100 illustrated in FIG. 9 is equivalent to, for example, the mobile stations UEs 10-1 to 10-n.

The mobile station UE 100 includes a data processing device 101, a universal subscriber identification module (USIM) 102, an LTE radio device 103a, an LTE antenna 104a, a third generation (3G) radio device 103b, a third generation antenna 104b, a keyboard 105, a microphone 106, and a speaker 107.

The universal subscriber identification module 102, the LTE radio device 103a, the third generation radio device 103b, the keyboard 105, the microphone 106, and the speaker 107 are connected to the data processing device 101.

The LTE antenna 104a is connected to the LTE radio device 103a. The third generation antenna 104b is connected to the third generation radio device 103b.

The data processing device 101 includes a processing unit 101a and a memory 101b.

The processing unit 101a executes various types of processes based on a program stored in the memory 101b, and a telephone number and subscriber information which are stored in the universal subscriber identification module 102.

In the hardware configuration illustrated in FIG. 9, the mobile station UE 100 includes the LTE radio device 103a, the LTE antenna 104a, the third generation radio device 103b, and the third generation antenna 104b. However, the mobile station UE 100 does not need to always include the third generation radio device 103b and the third generation antenna 104b.

FIG. 10 illustrates a hardware configuration of the relay node RN according to the embodiment.

The relay node RN 200 illustrated in FIG. 10 is equivalent to the relay node RN 20.

The relay node RN 200 includes a control device 201, a layer 2 switch (L2 SW) 202, an input/output (I/O) port 203, an analog/digital (A/D) converter 204, an amplifier (AMP) 205, an antenna 206, a universal subscriber identification module (USIM) 207, and a baseband processing device 208.

The control device 201 performs a call control, and monitors and controls components that configure the relay node RN 200. Moreover, the control device 201 executes the handover process according to the embodiment.

The control device 201 includes a central processing unit (CPU) 201a and a memory 201b. The central processing unit 201a executes a process based on a program stored in the memory 201b, so that various types of processes by the control device 201 are executed.

The control device 201 is connected to the universal subscriber identification module 207 and the layer 2 switch 202.

In the universal subscriber identification module 207, a telephone number and information of a subscriber are stored.

The layer 2 switch 202 is a relay device of a network. The layer 2 switch 202 is connected to the control device 201, the baseband processing device 208, and the input/output port 203.

The baseband processing device 208 executes a process of a digital signal before being radio-frequency (RF)-converted. The baseband processing device 208 includes a digital signal processor (DSP) 208a and a memory 208b.

The input/output port 203 is connected to the layer switch 202 and the analog/digital converter 204. The analog/digital converter 204 is connected to the input/output port 203 and the amplifier 205. The amplifier 205 is connected to the analog/digital converter 204 and the antenna 206.

Figure 11:
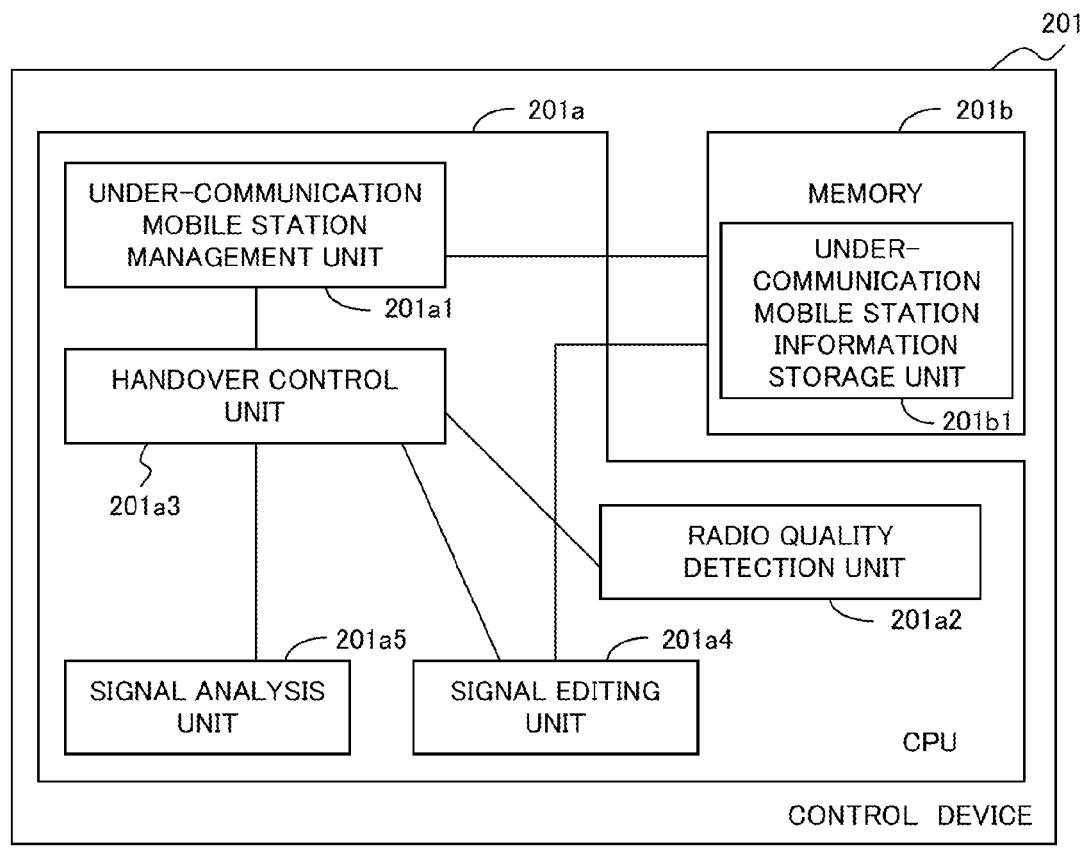
FIG. 11 illustrates a functional configuration of a control device of the relay node RN according to the embodiment.

FIG. 11 illustrates a functional configuration of the control device of the relay node RN according to the embodiment.

The control device 201 includes a central processing unit 201a and a memory 201b.

The central processing unit 201a includes an under-communication mobile station management unit 201a1, a radio quality detection unit 201a2, a handover control unit 201a3, a signal editing unit 201a4, and a signal analysis unit 201a5.

The memory 201b includes an under-communication mobile station information storage unit 201b1.

FIG. 12 illustrates an example of an information table stored in the under-communication mobile station information storage unit for each mobile station UE.

As illustrated in FIG. 12, in the under-communication mobile station information storage unit 201b1, an instance of each of the mobile stations UEs 10-1 to 10-n, such as a cell radio network temporary identifier (C-RNTI), is stored for each of the mobile stations UEs.

The instance of each of the mobile stations UEs 10-1 to 10-n is stored in the under-communication mobile station information storage unit 201b1 by the under-communication mobile station management unit 201a1 when the relay node RN 200 receives the "radio resource control connection request" message transmitted by each of the mobile stations UEs 10-1 to 10-n at the start of a communication.

As illustrated in FIG. 12, context information of each of the mobile stations UEs 10-1 to 10-n is stored in the under-communication mobile station information storage unit 201b1 for each of the mobile stations UEs.

The context information stored in the under-communication mobile station information storage unit 201b1 includes S1-MME interface UE identification information (MME UE S1AP ID), UE security functions (UE Security Capabilities), UE Aggregate Maximum Bit Rate, E-RAB identification information (E-RAB ID), E-RAB Level QoS Parameters, and an uplink GTP tunnel endpoint (UL GTP Tunnel Endpoint).

The context information illustrated in FIG. 12 is stored in the under-communication mobile station information storage unit 201b1 by the under-communication mobile station management unit 201a1 when the relay node RN 200 receives an "initial context setup request" message transmitted from the first mobility management device MME 40. The "initial context setup request" message is transmitted after the first mobility management device MME 40 completes a registration (attach) process respectively for the mobile stations UEs 10-1 to 10-n at the start of a communication.

The information stored in the under-communication mobile station information storage unit 201b1 is erased when a call of the mobile stations UEs 10-1 to 10-n is terminated, when an anomaly such as a radio link failure or the like occurs, or when a handover from the relay node RN 200 to another relay node RN or a radio base station T-DeNB occurs.

The radio quality detection unit 201a2 illustrated in FIG. 11 detects degradation of radio quality between the relay node RN 200 and the first radio base station S-DeNB 30s. If the radio quality detection unit 201a2 determines that the radio quality of the second radio base station T-DeNB 30t is more favorable than the radio quality of the first radio base station S-DeNB 30s based on a result of the detection, the radio quality detection unit 201a2 notifies the handover control unit 201a3 of the degradation of radio quality of a cell currently under communication and a favorable target cell.

The handover control unit 201a3 illustrated in FIG. 11 executes the handover process for the relay node RN 200 to the target cell upon receipt of a trigger for performing a handover from the radio quality detection unit 201a2. The handover control unit 201a3 transmits the "radio environment measurement report" message to the first radio base station S-DeNB 30s.

Additionally, upon receipt of the trigger for performing a handover from the radio quality detection unit 201a2, the handover control unit 201a3 executes the handover process respectively for the mobile stations UEs 10-1 to 10-n currently under communication to the target cell as referred to in the following <1> to <5>.

<1> The handover control unit 201a3 verifies whether or not any of the mobile stations UEs 10-1 to 10-n is currently under communication by referencing the under-communication mobile station information storage unit 201b1.

<2> If any of the mobile stations UEs 10-1 to 10-n is currently under communication in the above described <1>, the handover control unit 201a3 instructs the signal editing unit 201a4 to edit a handover control signal respectively for the mobile stations UEs 10-1 to 10-n.

<3> When the handover control unit 201a3 instructs the signal editing unit 201a4 to edit the signal in the above described <2>, the handover control unit 201a3 searches for adjacent cell information based on physical cell identification information (Physical Cell ID, PCI). Then, the handover control unit 201a3 identifies a radio base station T-DeNB which is a handover candidate, and obtains information of the second radio base station T-DeNB 30t, such as a public land mobile network (PLMN), an MME group, and the like. The handover control unit 201a3 further obtains information of an X2 connection state with the second radio base station T-DeNB 30t.

The handover control unit 201a3 determines that the handover is a handover (the X2 handover case) within the same mobility management device MME if the candidate radio base station belongs to the same MME group and the X2 connection is established. Otherwise, the handover control unit 201a3 determines that the handover is that between different mobility management devices MMES (S1 handover case).

The handover control signal that the handover control unit 201a3 instructs the signal editing unit 201a4 to edit when the handover is determined to be that within the same mobility management device MME is a "handover request" message. In the meantime, the handover control signal used when the handover is determined to be that between different mobility management devices MMES is a "handover execution request (Handover Required)" message.

<4> With the handover within the same mobility management device MME, the handover control unit 201a3 prevents the process (Forwarding) for forwarding the user data of the mobile stations UEs 10-1 to 10-n currently under communication to the second radio base station T-DeNB 30t from being executed.

The handover control unit 201a3 transmits the "handover request" message edited in the above described <2> to the second radio base station T-DeNB 30t.

Upon receipt of the "handover request acknowledgment (Handover Request Ack)" message from the second radio base station T-DeNB 30t, the handover control unit 201a3 instructs the signal editing unit 201a4 to edit the handover control signal based on the notified information of the mobile stations UEs 10-1 to 10-n and the received signal. Namely, the handover control unit 201a3 instructs the signal editing unit 201a4 to edit the "handover completion (radio resource control connection reconfiguration completion)" message.

The handover control unit 201a3 transmits the "handover completion (radio resource control connection reconfiguration completion)" message edited by the signal editing unit 201a4 to the second radio base station T-DeNB 30t.

<5> With the handover between different mobility management devices MMES, the handover control unit 201a3 prevents the process (forwarding) for respectively forwarding the user data of the mobile stations UEs 10-1 to 10-n currently under communication to the second radio base station T-DeNB 30t from being executed.

The handover control unit 201a3 transmits the "handover execution request" message edited in the above described <2> to the first mobility management device MME 40.

The signal editing unit 201a4 illustrated in FIG. 11 edits the handover control signal when the handover control unit 201a3 instructs the signal editing unit 201a4 to edit the signal. 9h FIG. 13 illustrates a configuration example of the "handover request" message according to the embodiment.

In the handover within the same mobility management device MME (X2 handover case), the signal editing unit 201a4 edits the "handover request" message for the mobile stations UEs 10-1 to 10-n currently under communication as the configuration illustrated in FIG. 13.

The signal editing unit 201a4 captures Old eNB UE X2 AP ID for each of the mobile stations UEs 10-1 to 10-n currently under communication, which is stored in the under-communication mobile station information storage unit 201b1, and repeatedly sets Old eNB UE X2 AP ID by the number of the mobile stations UEs 10-1 to 10-n currently under communication.

The signal editing unit 201a4 sets Target Cell ID and GUMMEI within the "handover request" message for the mobile stations UEs 10-1 to 10-n currently under communication by using Target Cell ID and GUMMEI which are used in the handover process of the relay node RN 200. Namely, in this embodiment, the signal editing unit 201a4 does not use Target Cell ID and GUMMEI, which are extracted based on the physical cell identification information (PCI) notified from the mobile stations UEs 10-1 to 10-n with the "radio environment measurement report" message.

The signal editing unit 201a4 repeatedly sets MME UE S1AP ID, UE Security Capabilities, UE Aggregate Maximum Bit Rate, E-RAB ID, E-RAB Level QoS Parameters, and UL GTP Tunnel Endpoint (Subscriber Profile ID for RAT/Frequency priority and DL Forwarding as options) by the number of the mobile stations UEs 10-1 to 10-n currently under communication. These items of information are notified to the relay node RN 200 with the "initial context setup request" message received from the first mobility management device MME 40, and stored in the under-communication mobile station information storage unit 201b1 for each of the mobile stations UEs 10-1 to 10-n.

The signal editing unit 201a4 creates a security intermediate key keNB* based on physical cell identification information and the like of the current target cell for each of the mobile stations UEs 10-1 to 10-n when the "handover request" message is transmitted. Then, the signal editing unit 201a4 repeatedly sets AS Security Information by the number of the mobile stations UEs 10-1 to 10-n currently under communication.

The signal editing unit 201a4 creates encoded information of RRC Context respectively for the mobile stations UEs 10-1 to 10-n currently under communication when the "handover request" message is transmitted, and repeatedly sets the information by the number of the mobile stations UEs 10-1 to 10-n currently under communication.

FIG. 14 illustrates another configuration example of the "handover request" message according to the embodiment.

In this embodiment, with the handover (X2 handover case) within the same mobility management device MME, the signal editing unit 201a4 can edit the "handover request" message respectively for the mobile stations UEs 10-1 to 10-n currently under communication as the configuration illustrated in FIG. 14.

Namely, the signal editing unit 201a4 may bundle the information of all the mobile stations UEs 10-1 to 10-n currently under communication, which are stored in the under-communication mobile station information storage unit 201b1, and edit one "handover request" message.

In the "handover request" message illustrated in FIG. 14, an eNB UE X2AP ID number indicates the number of mobile stations UEs 10-1 to 10-n which is stored in the under-communication mobile station information storage unit 201b1.

eNB UE X2AP ID Information indicates an information element (IE) where Old eNB UE X2AP ID is repeatedly settable by the number of Old eNB UE X2AP IDs.

A UE Context Information number indicates the number of mobile stations UEs 10-1 to 10-n which is stored in the under-communication mobile station information storage unit.

In the UE Context Information, MME UE S1AP ID, UE Security Capabilities, AS Security Information, UE Aggregate Maximum Bit Rate, and E-RABs To Be Setup List (Subscriber Profile ID for RAT/Frequency priority as an option) are repeatedly set by the number of UE Context Information.

When the "handover request" message illustrated in FIG. 13 is used, the signal editing unit 201a4 edits the "handover request" message by the number of mobile stations UEs 10-1 to 10-n currently under communication. The handover control unit 201a3 transmits the edited "handover request" message to the second radio base station T-DeNB 30t by the number of mobile stations UEs 10-1 to 10-n currently under communication.

In the meantime, when the "handover request" message illustrated in FIG. 14 is used, the signal editing unit 201a4 bundles "handover request" messages into one "handover request" message for the mobile stations UEs 10-1 to 10-n currently under communication, and edits the message. The handover control unit 201a3 transmits the bundled and edited "handover request" message to the second radio base station T-DeNB 30t.

Accordingly, by using the "handover request" message illustrated in FIG. 14, the number of times that the control signal used when the mobile stations UEs that are currently under communication and under the control of the relay node RN are handed over can be reduced.

FIG. 15 illustrates a configuration example of the "handover completion (radio resource control connection reconfiguration completion)" message according to the embodiment.

FIG. 15 illustrates a configuration example of the "handover completion (Handover Complete) (radio resource control connection reconfiguration completion (RRC Connection Reconf Comp))" message used when the "handover completion" message is edited for each of the mobile stations UEs 10-1 to 10-n currently under communication.

However, the signal editing unit 201a4 can bundle the information elements within the message illustrated in FIG. 15 as one handover control signal for the mobile stations UEs 10-1 to 10-n currently under communication, and edit the signal. In this case, the handover control unit 201a3 may transmit the bundled and edited handover control signal to the second radio base station T-DeNB 30t. Accordingly, in this case, the number of times that the control signal is transmitted when the mobile stations UEs, which are under the control of the relay node RN and currently under communication, are handed over can be reduced.

The signal analysis unit 201a5 illustrated in FIG. 11 analyzes the handover control signal received from the second radio base station T-DeNB 30t.

Additionally, if the handover control signal received from the second radio base station T-DeNB 30t is bundled for the mobile stations UEs 10-1 to 10-n as illustrated in FIG. 19 to be described later, the signal analysis unit 201a5 separates and analyzes the bundled received signal.

The signal analysis unit 201a5 notifies the handover control unit 201a3 of a result of the analysis of the handover control signal.

FIG. 16 illustrates a hardware configuration of the radio base station DeNB according to the embodiment.

The radio base station DeNB 300 illustrated in FIG. 16 is equivalent to, for example, the first radio base station S-DeNB 30s and the second radio base station T-DeNB 30t.

The radio base station DeNB 300 includes a control device 301, a layer 2 switch (L2SW) 302, an input/output (I/O) port 303, an analog/digital (A/D) converter 304, an amplifier (AMP) 305, an antenna 306, a transmission channel interface 307, and a baseband processing device 308.

The control device 301 performs a call control, and monitors and controls components that configure the radio base station DeNB 300. Moreover, the control device 301 executes the handover process according to the embodiment.

The control device 301 includes a central processing unit (CPU) 301a and a memory 301b. The central processing unit 301a executes a process according to a program stored in the memory 301b, so that various types of processes by the control device 301 are executed.

The control device 301 is connected to the layer 2 switch 302.

The layer 2 switch 302 is a relay device of a network. The layer 2 switch 302 is connected to the control device 301, the baseband processing device 308, the input/output port 303, and the transmission channel interface 307.

The baseband processing device 308 executes a process of a digital signal before being radio-frequency (RF)-converted. The baseband processing device 308 includes a digital signal processor (DSP) 308a and a memory 308b.

The input/output port 303 is connected to the layer switch 302 and the analog/digital converter 304. The analog/digital converter 304 is connected to the input/output port 303 and the amplifier 305. The amplifier 305 is connected to the analog/digital converter 304 and the antenna 306. Moreover, the transmission channel interface 307 is connected to the layer 2 switch 302, and an Internet protocol (IP) network positioned outside the radio base station DeNB 300.

FIG. 17 illustrates a functional configuration of the control device of the radio base station DeNB according to the embodiment.

The control device 301 includes the central processing unit 301a and the memory 301b.

The central processing unit 301a includes a signal analysis unit 301a1, a handover control unit 301a2, and a signal editing unit 301a3.

The signal analysis unit 301a1 analyzes the handover control signal. For example, if the radio base station DeNB 300 is the second radio base station T-DeNB 30t, the signal analysis unit 301a analyzes the "handover request" message received from the relay node RN 20.

Moreover, if handover control signals are bundled into one signal for the mobile stations UEs 10-1 to 10-n, the signal analysis unit 301a1 separates and analyzes the bundled received signal.

The signal analysis unit 301a1 notifies the handover control unit 301a2 of a result of the analysis of the handover control signal.

The handover control unit 301a2 executes the handover process for the relay node RN 20.

In addition, the handover control unit 301a2 executes the handover process respectively for the mobile stations UEs 10-1 to 10-n that are under the control of the relay node RN 20 and currently under communication.

For example, if the radio base station DeNB 300 is the second radio base station T-DeNB 30t, the handover control unit 301a2 executes the handover process respectively for the mobile stations UEs 10-1 to 10-n to a target cell in the X2 handover case as referred to in the following <1> to <5>.

<1> Upon receipt of the handover control signal ("handover request" message) from the signal analysis unit 301a1, the handover control unit 301a2 performs a handover control based on the information of the mobile stations UEs 10-1 to 10-n, which are notified from the signal analysis unit 301a1, and the received signal.

When the handover control is successfully performed, the handover control unit 301a2 instructs the signal editing unit 301a3 to edit the "handover request acknowledgment" message based on the information of the mobile stations UEs 10-1 to 10-n, which are notified from the signal analysis unit 301a1, and the received signal.

<2> The handover control unit 301a2 transmits the "handover request acknowledgment" message edited by the signal editing unit 301a3 to the relay node RN 20.

<3> The handover control unit 301a2 receives, from the signal analysis unit 301a1, the "handover complete (radio resource control connection reconfiguration complete)" message transmitted from the relay node RN 20. Then, the handover control unit 301a2 instructs the signal editing unit 301a3 to edit the "path switch request" message based on the information of the mobile stations UEs 10-1 to 10-n, which are notified form the signal analysis unit 301a1, and the received signal.

<4> The handover control unit 301a2 transmits the "path switch request" message edited by the signal editing unit 301a3 to the first mobility management device MME 40.

The signal editing unit 301a3 illustrated in FIG. 17 edits the handover control signal based on an instruction of the handover control unit 301a2.

<5> FIG. 18 illustrates a configuration example of the "handover request acknowledgement" message according to the embodiment. Moreover, FIG. 19 illustrates another configuration example of the "handover request acknowledgement" message according to the embodiment.

In FIGS. 18 and 19, the signal editing unit 301a3 creates encoded information of Target eNB To Source eNB Transparent Container respectively for the mobile stations UEs 10-1 to 10-n currently under communication, and repeatedly sets the encoded information by the number of the mobile stations UEs 10-1 to 10-n currently under communication.

In FIG. 19, an eNB UE X2AP ID number indicates the number of mobile stations UEs of which a handover preparation (Handover Preparation) process is successfully executed, which is notified with the "handover request" message.

Additionally, in eNB UE X2AP ID Information, Old eNB UE X2AP ID, New eNB UE X2AP ID, E-RABs Admitted List, and Target eNB To Source eNB Transparent Container (Criticality Diagnostics as an option) are repeatedly set by the number of eNB UE X2AP IDs.

If the "handover request acknowledgment (Handover Request Acknowledge)" message illustrated in FIG. 18 is used, the signal editing unit 301a3 edits the "handover request acknowledgment" message by the number of mobile stations UEs 10-1 to 10-n currently under communication. The handover control unit 301a2 transmits the edited "handover request" message to the relay node RN 20 by the number of mobile stations UEs 10-1 to 10-n currently under communication.

Alternatively, if the "handover request acknowledgment" message illustrated in FIG. 19 is used, the signal editing unit 301a3 bundles "handover request" messages into one message for the mobile stations UEs 10-1 to 10-n currently under communication, and edits the message. The handover control unit 301a2 transmits the bundled and edited "handover request" message to the relay node RN 20.

Accordingly, by using the "handover request acknowledgment" message illustrated in FIG. 19, the number of times that the control signal is transmitted when the mobile stations UEs, which are under the control of the relay node RN and currently under communication, are handed over can be reduced.

An example of operations of the handover process of the mobile station UE 100, the relay node RN 2000, and the radio base station DeNB 300 is described below.

In the following example, the mobile station UE 100 corresponds to the mobile stations UEs 10-1 to 10-n. The relay node RN 200 corresponds to the relay node RN 20. The radio base station DeNB 300 corresponds to the second radio base station T-DeNB 30t. Moreover, the example is described by taking, as an example, a case where the relay node 200 and the radio base station DeNB 300 transmit and receive the handover control signal for the mobile station UE 100 in the X2 handover case by bundling and editing the handover control signal as illustrated in FIGS. 14 and 19.

Figure 20:
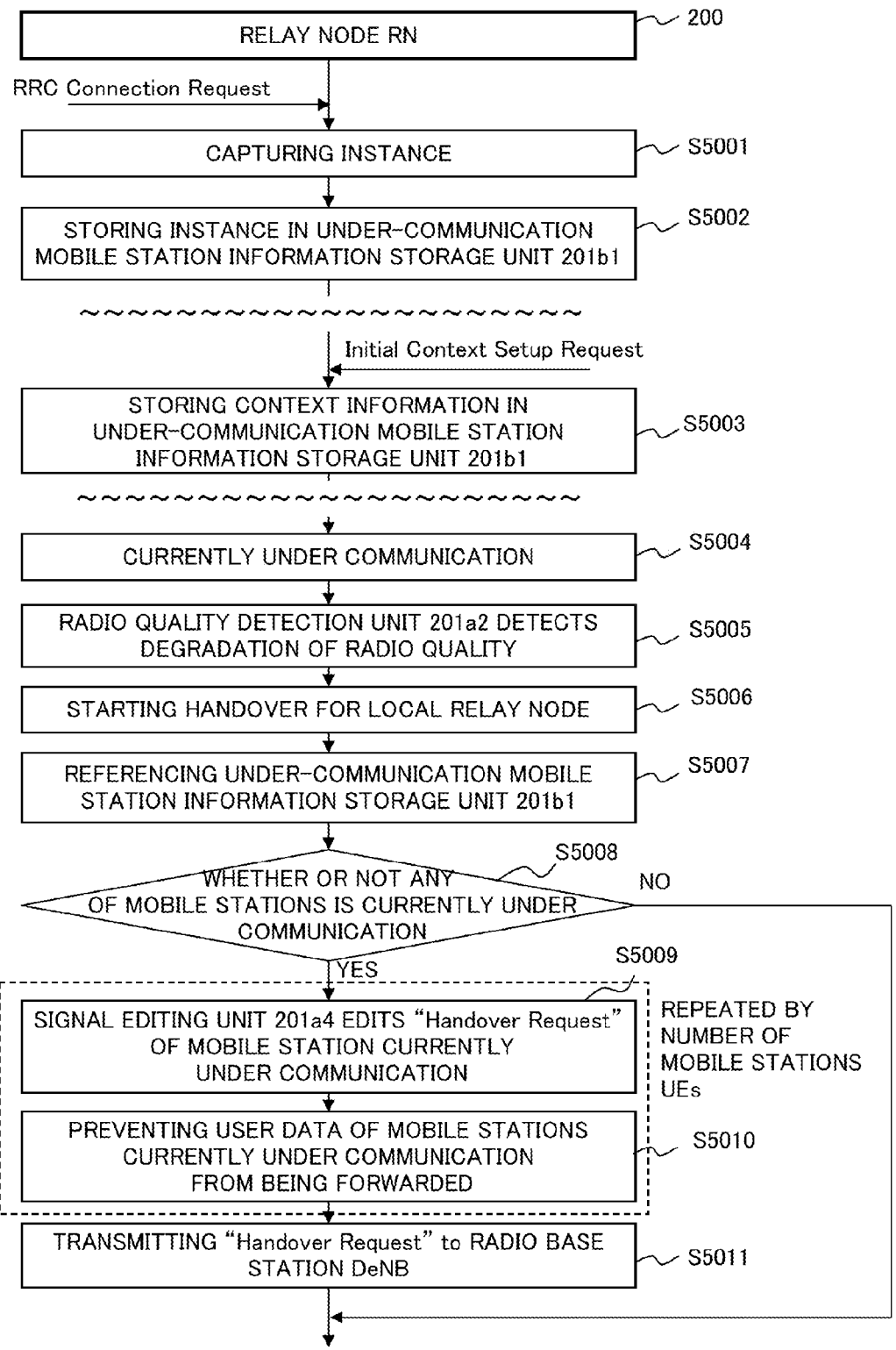
FIG. 20 is a flowchart illustrating operations of the relay node RN from when a "radio resource control connection request" message is received until a "handover request" message is transmitted.
Figure 21:
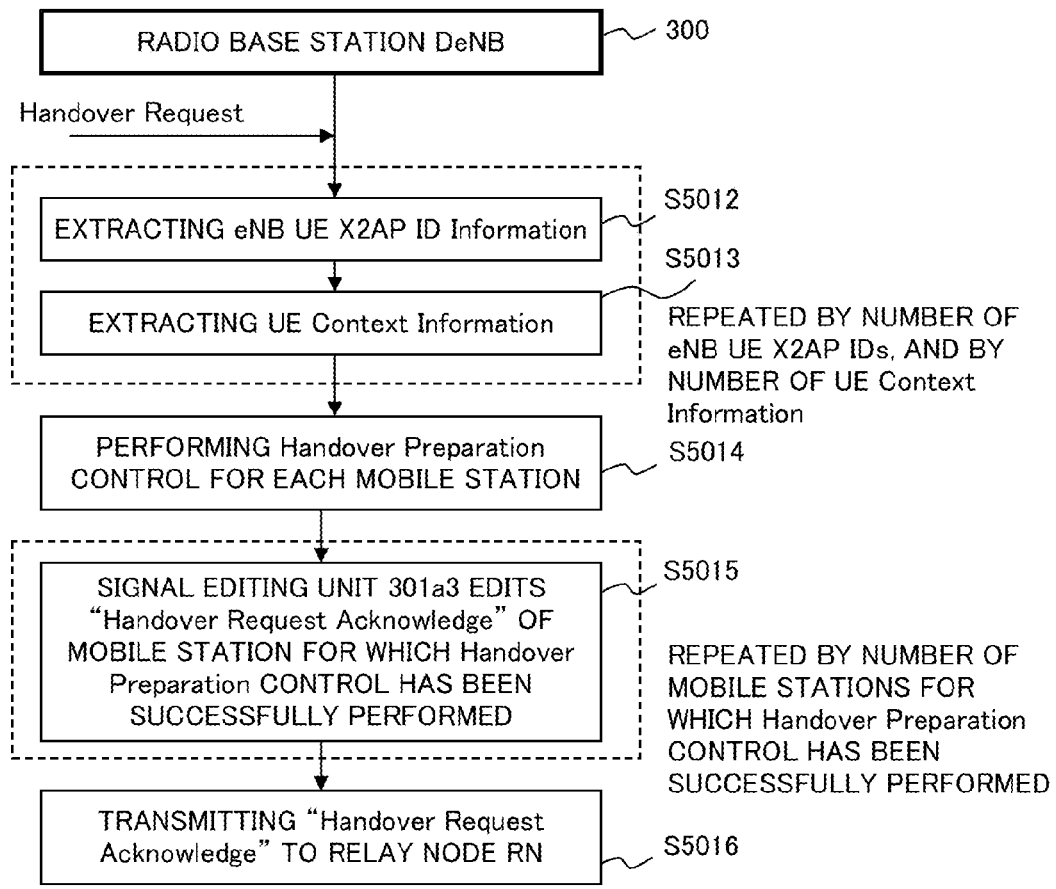
FIG. 21 is a flowchart illustrating operations of a radio base station DeNB from when the "handover request"

FIG. 20 is a flowchart illustrating the operations of the relay node RN from when the relay node RN receives the "radio resource control connection request" message until the relay node RN transmits the "handover request" message. FIG. 21 is a flowchart illustrating the operations of the radio base station DeNB from when the radio base station DeNB receives the "handover request" message until the radio base station DeNB transmits the "handover request acknowledgment" message. FIG. 22 is a flowchart illustrating the operations of the relay node RN from when the relay node RN receives the "handover request acknowledgment" message until the relay node RN transmits the "handover completion" message. FIG. 23 is a flowchart illustrating the operations of the radio base station DeNB from when the radio base station DeNB receives the "handover completion" message until the radio base station DeNB completes patch switching.

In FIG. 20, upon receipt of the "radio resource control connection request (RRC Connection Request)" message from the mobile station UE 100, the relay node RN 200 captures an instance, such as C-RNTI of the mobile station UE 100 (S5001). Then, the under-communication mobile station management unit 201a1 stores the captured instance of the mobile station UE 100 in the under-communication mobile station information storage unit 201b1 for each of the mobile stations UEs (S5002).

Thereafter, upon receipt of the "initial context setup request" message from the first mobility management device MME 40, the under-communication mobile station management unit 201a1 stores context information included in the received message in the under-communication mobile station information storage unit 201b1 for each of the mobile stations UEs (S5003). Namely, the under-communication mobile station management unit 201a1 associates the context information of the mobile station UE 100 with the instance of the mobile station UE 100, and stores the context information and the instance in the under-communication mobile station information storage unit 201b1.

Assume that the mobile station UE 100 moves from the communication area of the first radio base station S-DeNB 30s to the communication area of the radio base station DeNB 300 along with the relay node RN 200 when the mobile station UE 100 is currently under communication (S5004).

The radio quality detection unit 201a2 detects degradation of radio quality between the relay node RN 200 and the first radio base station S-DeNB 30s due to the move of the relay node RN 200 (S5005). If the radio quality detection unit 201a2 determines that the radio quality of the radio base station DeNB 30 is more favorable than the radio quality of the first radio base station S-DeNB 30s, the radio quality detection unit 201a2 notifies the handover control unit 201a3 of the degradation of the radio quality of a cell currently under communication, and a favorable target cell.

The handover control unit 201a3 starts the handover process for the relay node RN 200 by using, as a trigger, the notification from the radio quality detection unit 201a2 (S5006).

The handover control unit 201a3 verifies whether or not any of the mobile stations UEs 100 is currently under communication (S5008) by referencing the under-communication mobile station information storage unit 201b1 (S5007).

If any of the mobile stations UEs 100 is not currently under communication ("NO" in S5008), the handover control unit 201a3 continues the handover process for the relay node RN 200.

If any of the mobile stations UEs 100 is currently under communication ("YES" in S5008), the handover control unit 201a3 instructs the signal editing unit 201a4 to edit the "handover request" message for the mobile station UE 100 currently under communication. The signal editing unit 201a4 edits the "handover request" message (S5009).

Additionally, the handover control unit 201a3 prevents the forwarding process of user data for the mobile station UE 100 currently under communication (S5010) from being executed.

Steps S5009 and S5010 are repeatedly executed by the number of mobile stations UEs 100 currently under communication. Therefore, the signal editing unit 201a4 bundles "handover request" messages, the number of which corresponds to that of the mobile stations UEs 100 currently under communication, into one message, and edits the message. The bundled and edited "handover request" message is transmitted from the signal editing unit 201a4 to the handover control unit 201a3.

The handover control unit 201a3 transmits the "handover request" message bundled and edited by the signal editing unit 201a4 to the radio base station DeNB 300 (S5011).

In FIG. 21, when the radio base station DeNB 300 receives the "handover request" message from the relay node RN 200, the signal analysis unit 301a1 extracts eNB UE X2AP ID Information from the received message (S5012). Moreover, the signal analysis unit 301a1 extracts UE Context Information (S5013).

The extraction of eNB UE X2AP ID Information in step S5012 is repeatedly performed by the number of eNB UE X2AP IDs included in the "handover request" message. Moreover, the extraction of UE Context Information in step S5013 is repeatedly performed by the number of UE Context Information included in the "handover request" message.

The signal analysis unit 301a1 notifies the handover control unit 301a1 of the extracted information elements.

The handover control unit 301a2 performs a handover preparation control for the mobile station UE currently under communication based on the information elements notified from the signal analysis unit 301a1 (S5014). Then, the handover control unit 301a2 instructs the signal editing unit 301a3 to edit the "handover request acknowledgment (Handover Request Acknowledge)" message for the mobile station UE 100 for which the handover preparation control has been successfully performed.

The signal editing unit 301a3 edits the "handover request acknowledgment" message based on the instruction from the handover control unit 301a2 (S5015).

The edition in step 5015 is repeatedly performed by the number of mobile stations UEs 100 for which the handover preparation control has been successfully performed. Then, the signal editing unit 301a3 bundles, into one message, "handover request acknowledgment" messages corresponding to the number of mobile stations UEs 100 for which the handover preparation control has been successfully performed, and edits the message. The bundled and edited "handover request acknowledgment" message is transmitted from the signal editing unit 301a3 to the handover control unit 301a2.

The handover control unit 301a2 transmits the "handover request acknowledgment" message bundled and edited by the signal editing unit 301a3 to the relay node RN 200 (S5016).

In FIG. 22, when the relay node RN 200 receives the "handover request acknowledgment" message from the radio base station DeNB 300, the signal analysis unit 201a5 extracts eNB UE X2AP ID Information from the received message (S5017). The extraction of eNB UE X2AP ID Information in step S5017 is repeatedly performed by the number of eNB UE X2AP IDs included in the "handover request acknowledgment" message.

The signal analysis unit 201a5 notifies the handover control unit 201a3 of the extracted information elements.

The handover control unit 201a3 performs a handover execution control respectively for the mobile stations UEs 100 based on the information elements notified from the signal analysis unit 201a5 (S5018).

The handover control unit 201a3 prevents user data of the mobile station UE 100 from being respectively forwarded. Accordingly, the handover control unit 201a3 does not start the forwarding process of the user data even when the "handover request acknowledgment" message for the mobile station UE 100 is received from the radio base station DeNB 300.

The handover control unit 201a3 instructs the signal editing unit 201a4 to edit the "handover completion (Handover Complete)" message for the mobile station UE 100 for which the handover execution control has been performed.

The signal editing unit 201a4 edits the "handover completion" message of the mobile station UE 100, for which the handover execution control has been performed, based on the instruction from the handover control unit 201a3. The edited "handover request acknowledgment" message is transmitted from the signal editing unit 201a4 to the handover control unit 201a3.

The handover control unit 201a3 transmits the "handover completion" message edited by the signal editing unit 201a4 to the radio base station DeNB 300 (S5019).

In FIG. 23, when the radio base station DeNB 300 receives the "handover completion" message from the relay node RN 200, the signal analysis unit 301a1 analyzes the received "handover completion" message. Then, the signal analysis unit 301a1 transmits the information elements obtained with the analysis to the handover control unit 301a2.

The handover control unit 301a2 performs path switching for the mobile station UE 100 to the first mobility management device MME 40 and the gateway GW 50 based on the information elements received from the signal analysis unit 301a1 (S5020).

In this way, the handover process for the mobile station UE 100 that is currently under communication and moved along with the relay node RN 200 is complete (S5021).

In this embodiment, the relay node RN 200 autonomously executes the handover process for the mobile station UE 100 along with the handover process for the relay node RN 200 upon detection of degradation of radio quality between the relay node RN 200 and the first radio base station S-DeNB 30s.

Namely, the relay node RN 200 autonomously starts the handover process respectively for the mobile stations UEs 100 based on the stored information of the mobile stations UEs 100 currently under communication.

Additionally, the relay node RN 200 prevents the user data of the mobile station UE 100 currently under communication from being respectively forwarded. As a result, the relay node RN 200 does not forward the user data even if the relay node RN 200 receives the "handover request acknowledgment" message for the mobiles station UE 100 from the radio base station DeNB 300.

Therefore, according to the embodiment, unneeded forwarding of user data from and to the same relay node RN 200 is eliminated, whereby forwarding of user data at the time of the handover process can be efficiently performed.

Additionally, in this embodiment, handover control signals are bundled into one signal and edited for mobile stations UEs 100 currently under communication, and transmitted and received between the relay node RN 200 and a radio base station DeNB 300 targeted by a handover.

Therefore, according to the embodiment, the numbers of times that the handover control signal for the mobile station UE 100 between the relay node RN 200 and the radio base station DeNB 300 is transmitted and received can be reduced.

According to the embodiment, forwarding of user data can be efficiently performed, and the number of times that the handover control signal is transmitted can be reduced, whereby radio channels can be efficiently used, and interference exerted by other mobile stations and that exerted on other mobile stations can be reduced.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A relay node which is registered to a first radio base station and a first mobility management device and which relays a communication between a first mobile station and the first radio base station, the relay node comprising:
a first control unit configured to store mobile station information indicating that the first mobile station is communicating with the first radio base station, to execute a handover process for the relay node and decide to hand over the first mobile station communicating with the first radio base station from the first radio base station to a second radio base station when a degradation of radio quality between the relay node and the first radio base station is detected, to generate a handover control signal for handing over the first mobile station communicating with the first radio base station from the first radio base station to the second radio base station, based on the mobile station information, and to transmit the handover control signal to the second radio base station or the first mobility management device,
wherein the first control unit prevents user data of the first mobile station which is received from the first radio base station from being forwarded to the second radio base station in association with the handing over the first mobile station from the first radio base station to the second radio base station.

2. The relay node according to claim 1, wherein
the first control unit bundles handover control signals for a plurality of mobile stations into one handover control signal and edits the one handover control signal, and transmits the bundled and edited handover control signal.

3. The relay node according to claim 2, wherein
the second radio base station analyzes the one handover control signal which is received from the relay node and bundled for the plurality of mobile stations, executes a handover process for the plurality of mobile stations for each of the analyzed mobile stations, bundles the handover control signals for the plurality of mobile stations for which the handover process is executed into one handover control signal, and transmits the one bundled handover control signal to the relay node, and
wherein the relay node receives the one bundled handover control signal from the second radio base station.

4. The relay node according to claim 3, wherein
the first control unit analyzes the handover control signal received from the second radio base station.

5. The relay node according to claim 1, wherein
the first control unit performs a handover control without forwarding the user data of the first mobile station which is received from the first radio base station, upon when a handover request acknowledgment signal is received from the second radio base station, and transmits a handover completion signal to the second radio base station.

6. The relay node according to claim 1, wherein
the first control unit performs a handover control without forwarding the user data of the first mobile station which is received from the first radio base station when a handover command signal is received from the first mobility management device, and transmits a handover acknowledgment signal to the second radio base station.

7. The relay node according to claim 5, wherein
the first control unit decides whether to hand over a second mobile station to either the second radio base station or a third radio base station different from the second radio base station based on a radio environment measurement report signal received from the second mobile station, and forwards user data of the second mobile station to the third radio base station and performs the handover control when the first control unit decides to hand over the second mobile station to the third radio base station.

8. A radio communication method for handing over a relay node which is registered to a first radio base station and a first mobility management device and relays a communication between a first mobile station and the first radio base station, and the first mobile station from the first radio base station to a second radio base station, the radio communication method comprising:
storing, by the relay node, mobile station information indicating that the first mobile station is communicating with the first radio base station;
executing, by the relay node, a handover process for the relay node and deciding to hand over the first mobile station communicating with the first radio base station from the first radio base station to the second radio base station when a degradation of radio quality between the relay node and the first radio base station is detected;
generating, by the relay node, a handover control signal for handing over the first mobile station communicating with the first radio base station from the first radio base station to the second radio base station, based on the mobile station information; and
transmitting, by the relay node, the handover control signal to the second radio base station or the first mobility management device,
wherein the relay node prevents user data of the first mobile station which is received from the first radio base station from being forwarded to the second radio base station in association with the handing over the first mobile station from the first radio base station to the second radio base station.

9. The radio communication method according to claim 8, wherein
the relay node bundles handover control signals for a plurality of mobile stations into one handover control signal and edits the one handover control signal, and transmits the bundled and edited handover control signal.

10. The radio communication method according to claim 9, wherein
the second radio base station analyzes the handover control signal received from the relay node for each of the mobile stations, executes a handover process for the plurality of mobile stations for each of the analyzed mobile stations, bundles the handover control signals for the plurality of mobile stations for which the handover process is executed into one handover control signal, and transmits the one handover control signal to the relay node.

11. The radio communication method according to claim 10, wherein
the relay node analyzes the handover control signal received from the second radio base station.

12. The radio communication method according to claim 8, wherein
the relay node performs a handover control without forwarding the user data of the first mobile station, which is received from the first radio base station, upon receipt of a handover request acknowledgment signal from the second radio base station, and transmits a handover completion signal to the second radio base station.

13. The radio communication method according to claim 8, wherein the relay node performs a handover control without forwarding the user data of the first mobile station, which is received from the first radio base station, when a handover command signal is received from the first mobility management device, and transmits a handover acknowledgment signal to the second radio base station.

14. The radio communication method according to claim 12, wherein the relay node decides whether to hand over a second mobile station to either the second radio base station or a third radio base station different from the second radio base station based on a radio environment measurement report signal received from the second mobile station, forwards user data of the second mobile station, which is prevented from being forwarded, to the third radio base station, and performs the handover control when the relay node decides to hand over the second mobile station to the third radio base station.

\* \* \* \* \*